(12) United States Patent
Bantz et al.

(10) Patent No.: US 7,406,500 B2
(45) Date of Patent: Jul. 29, 2008

(54) TECHNIQUES FOR PROVIDING A VIRTUAL WORKSPACE COMPRISED OF A MULTIPLICITY OF ELECTRONIC DEVICES

(75) Inventors: David F. Bantz, Bedford Hills, NY (US); Ponani Gopalakrishnan, Yorktown Heights, NY (US); Daniel M. Gruen, Newton, MA (US); Lorraine M. Herger, Port Chester, NY (US); Nathan Junsup Lee, New City, NY (US); Dennis Gerard Shea, Ridgefield, CT (US); Marisa S. Viveros, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 10/442,218

(22) Filed: May 20, 2003

(65) Prior Publication Data

US 2004/0236818 A1 Nov. 25, 2004

(51) Int. Cl.
*G06F 15/16* (2006.01)
*G06F 15/173* (2006.01)
(52) U.S. Cl. .................. 709/205; 709/217; 709/238
(58) Field of Classification Search ................. 709/204, 709/205, 217, 238
See application file for complete search history.

(56) References Cited

U.S. PATENT DOCUMENTS 5,485,634 A * 1/1996 Weiser et al. ............... 455/507

5,991,809 A * 11/1999 Kriegsman .................. 709/226

(Continued)

FOREIGN PATENT DOCUMENTS

EP 0 845 894 A2 6/1998

(Continued)

OTHER PUBLICATIONS

Hodes et al., "Composable Ad Hoc Location-Based Services for Heterogeneous Mobile Clients," Wireless Networks, 5, pp. 411-427, (1999).

(Continued)

*Primary Examiner*—Douglas B Blair
(74) *Attorney, Agent, or Firm*—Ryan, Mason & Lewis, LLP; Douglas W. Cameron, Esq.

(57) ABSTRACT

A virtual workspace is provided for a user with a number of electronic devices, in which information can be exchanged among the electronic devices through a number of connections between the electronic devices. The virtual workspace is provided by determining where services are located and the type of the services, determining one or more data formats associated with data accessible by one or more of the electronic devices. A portion of the data has a given one of one or more data formats. An electronic device is selected based at least in part on predetermined criteria and the given data format. A route through the connections to the selected electronic device is determined, where the route may comprise a given one or more of the connections. At least the portion of the data associated with the given data format is routed to the selected electronic device. The portion of the data is utilizable for presentation by the selected electronic device when received by the selected electronic device.

25 Claims, 17 Drawing Sheets

U.S. PATENT DOCUMENTS

| | | | |
|---|---|---|---|
| 6,370,580 B2* | 4/2002 | Kriegsman | 709/226 |
| 6,498,835 B1 | 12/2002 | Skladman et al. | 379/88.12 |
| 6,909,721 B2* | 6/2005 | Ekberg et al. | 370/401 |
| 7,089,298 B2* | 8/2006 | Nyman et al. | 709/220 |
| 7,102,640 B1* | 9/2006 | Aholainen et al. | 345/440 |
| 7,164,885 B2* | 1/2007 | Jonsson et al. | 455/41.2 |
| 7,194,760 B2* | 3/2007 | Nordman et al. | 726/5 |
| 7,209,705 B2* | 4/2007 | Moles et al. | 455/41.2 |
| 7,249,182 B1* | 7/2007 | Heinonen et al. | 709/227 |
| 7,260,638 B2* | 8/2007 | Crosbie | 709/229 |
| 7,324,226 B2* | 1/2008 | Fritz et al. | 358/1.15 |
| 7,324,462 B1* | 1/2008 | Page et al. | 370/255 |
| 7,339,907 B2* | 3/2008 | Liscano et al. | 370/329 |
| 7,340,214 B1* | 3/2008 | Hamberg | 455/41.2 |
| 7,340,438 B2* | 3/2008 | Nordman et al. | 705/64 |
| 2001/0027480 A1 | 10/2001 | Kriegsman | |
| 2002/0037699 A1* | 3/2002 | Kobayashi et al. | 455/41 |
| 2002/0049817 A1 | 4/2002 | Drory et al. | 709/206 |
| 2002/0059377 A1 | 5/2002 | Bandhole et al. | |
| 2002/0069278 A1* | 6/2002 | Forslow | 709/225 |
| 2002/0120750 A1* | 8/2002 | Nidd | 709/227 |
| 2002/0174364 A1* | 11/2002 | Nordman et al. | 713/201 |
| 2003/0037033 A1* | 2/2003 | Nyman et al. | 707/1 |
| 2003/0069989 A1* | 4/2003 | Silvester | 709/238 |

FOREIGN PATENT DOCUMENTS

| | | |
|---|---|---|
| JP | 4072854 A | 3/1992 |
| JP | 11146000 A | 5/1999 |
| JP | 2001022690 A | 1/2001 |
| WO | WO 00/78017 A1 | 12/2000 |

OTHER PUBLICATIONS

Kuroda et al., "A Study of Autonomous Data Coherency Protocol for Mobile Devices," IEEE, (1999).

"Medium Self-Description for Removable Medium Devices," IBM Technical Disclosure Bulletin, vol. 37, No. 11, pp. 139-145 (1994).

* cited by examiner

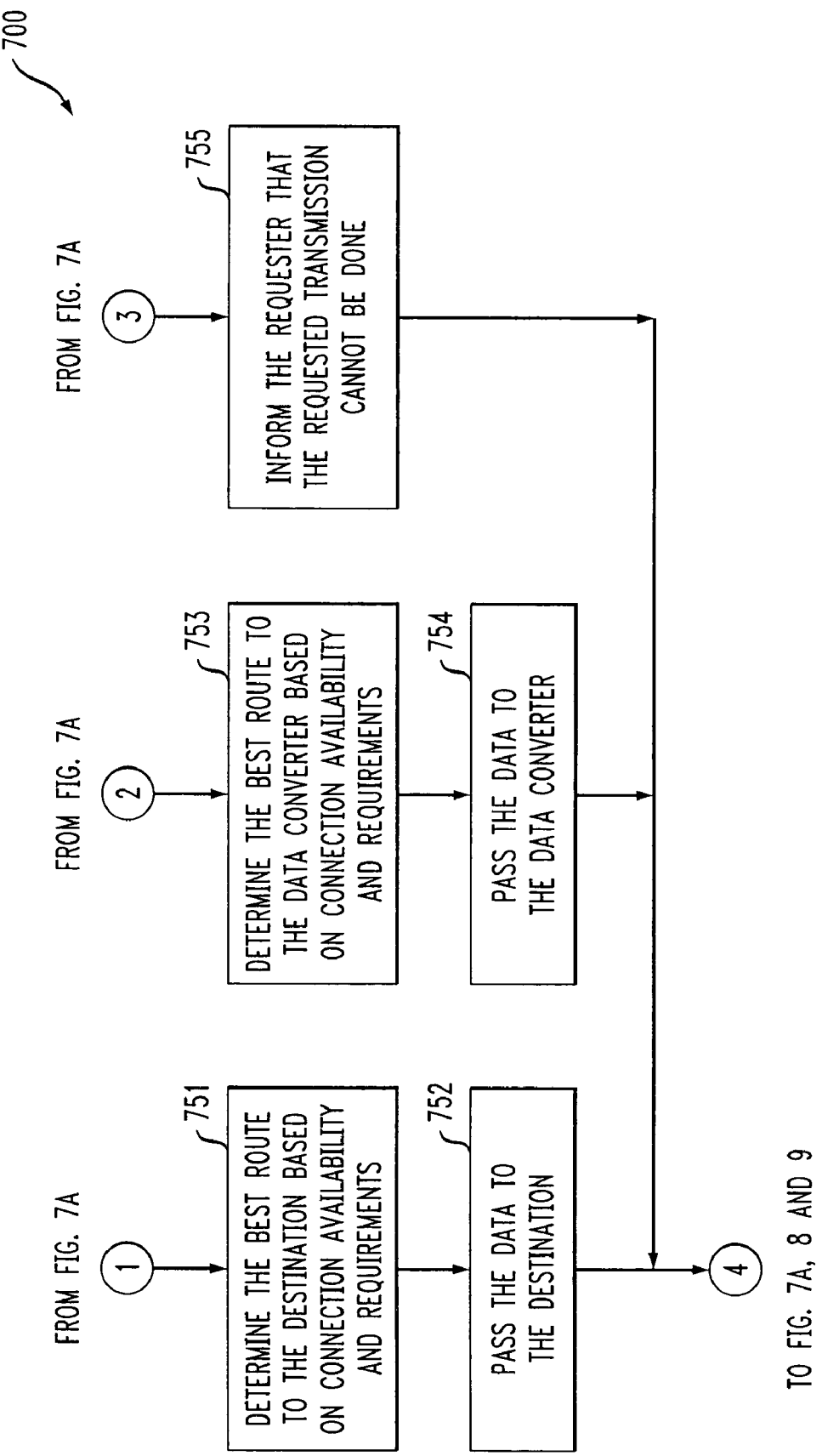

TECHNIQUES FOR PROVIDING A VIRTUAL WORKSPACE COMPRISED OF A MULTIPLICITY OF ELECTRONIC DEVICES

FIELD OF THE INVENTION

The present invention relates to communication between electronic devices and, more particularly, relates to communication by a number of different electronic devices.

BACKGROUND OF THE INVENTION

Today, people tend to have multiple electronic devices. For instance, a person might have a cellular phone, a personal digital assistant (PDA), and a laptop computer, which may or may not all reside in the same location. These electronic devices typically work in stand-alone modes and may synchronize with a single other electronic device, generally upon user request and intervention. There is, however, a trend toward providing more connectivity between many electronic devices. For example, some electronic devices are designed to communicate with multiple electronic devices. However, the data sharing is done typically between predetermined sets of the electronic devices and between electronic devices that share the same format for the data.

Additionally, when two or more people, each carrying his or her own set of multiple electronic devices, wish to use electronic devices to communicate, a conventional way to perform the communication is between two of the same type of electronic device. For instance, one person can transfer a file from one PDA to a PDA owned by another. If, however, a user wants to share information between two randomly selected electronic devices, it is not so straightforward to configure the selected electronic devices to communicate with each other, unless the two electronic devices are running common programs and common physical links. Thus, even though the number of electronic devices used by a single individual continues to increase, problems still remain when trying to enable communications between electronic devices.

Thus, what is needed are improved techniques sharing information between electronic devices for enabling electronic devices to communicate.

SUMMARY OF THE INVENTION

The present invention provides techniques for, among other things, exchanging data between an electronic device containing the data to a dynamically chosen electronic device that is best suited to represent the data under current conditions, hence providing a user a set of devices that appears to the user to be one virtual workspace.

In an aspect of the invention, techniques are disclosed for providing a virtual workspace for a number of electronic devices, in which information can be exchanged among the electronic devices through a number of connections between the electronic devices. The virtual workspace is provided by determining one or more data formats associated with data accessible by one or more of the electronic devices. A portion of the data has a given one of one or more data formats. An electronic device is selected based at least in part on predetermined criteria and the given data format. A route through the connections to the selected electronic device is determined, where the route comprises a given one or more of the connections. At least the portion of the data associated with the given data format is routed through at least one of the given connections. The portion of the data is utilizable for presentation by the selected electronic device when received by the selected electronic device.

The data may reside on one of the electronic devices or on a remote electronic device that is not one of the electronic devices. Additionally, the portion of data can be all or less than all of the data.

The data can be presented on the chosen electronic device. It should be noted that there could, at any time, be multiple chosen devices, each electronic device presenting one or more portions of the data.

The predetermined criteria can also include device criteria, such as screen resolution, application programs, and audio, video and other formats the device is able to present. The predetermined criteria can include user criteria, such as having one type of data format always be displayed on one particular electronic device. The user preferences may be applied through the use of a multidimensional score. The multidimensional score may be determined by adding a number of terms, each term having a value calculated by multiplying a variable by a weight. The weight can correspond to a user preference, and the variable can indicate some quantifiable information about an electronic device, such as fidelity of reproduction or proximity to user attention.

The data formats may be determined through file extensions, markers such as markup language tags, or any other data format indicator.

The portion of the data may need to be converted before the data portion can be presented on the chosen electronic device. If so, a data converter can be selected from data converters available on the electronic devices. The data portion can be routed through the electronic devices to the data converter and then routed to the chosen electronic device. It should be noted that multiple portions of data could be routed to multiple data converters and presented by multiple devices. The data portion can be converted from one data format to another, can be transcoded so that the data portion is reformatted, or both. The data may also be routed through an electronic device having the data converter before being routed to the selected electronic device.

In order to determine a electronic device meeting predetermined criteria, service discovery may be performed. Service discovery can be performed by accessing a service directory. The service directory can comprise attributes about each of the electronic devices and connections between the same. The service directory may be created and reside on each of the electronic devices, one or more of the electronic devices, or on a remote electronic device that is not one of the electronic devices.

In another aspect of the invention, techniques are provided for providing a virtual workspace for a number of electronic devices, where information can be exchanged among electronic devices through a plurality of connections between the electronic devices. One or more attributes are determined for one or more of the electronic devices in the workspace, and the attributes may be stored in one or more service directories. The attributes may comprise capabilities of the electronic devices, connection types for connections between electronic devices, device types for the electronic devices, applications and services that can be provided by the electronic devices, and access rights for each service provided by an electronic device. One or more data formats are determined, where the data format or formats are associated with data accessible by at least one of the electronic devices. A portion of the data has a given one of one or more data formats. An electronic device is selected based at least in part on the attributes and the given data format. A route is determined through the connections to the selected electronic device, the route comprising a given one or more of the connections. At least the portion of data associated with the given data format is routed through one or more of the connections to the selected electronic device. The portion of the data being utilizable for presentation by the selected electronic device when received by the selected electronic device.

A second virtual workspace may be formed by determining a second service directory for a second number of electronic devices. The second service directory may be accessed to select an electronic device of the second virtual workspace. The first and second workspace may be connected by connecting one or more electronic devices from the first virtual workspace to one or more electronic devices in the second virtual workspace.

A more complete understanding of the present invention, as well as further features and advantages of the present invention, will be obtained by reference to the following detailed description and drawings.

BRIEF DESCRIPTION OF THE DRAWINGS

FIGS. 7A and 7B are detailed flowcharts of a method for selecting an electronic device and dynamic routing of data to the selected electronic device, in accordance with a preferred embodiment of the invention;

DETAILED DESCRIPTION OF PREFERRED EMBODIMENTS

Aspects of the present invention allow electronic devices to be connected together and to exchange data. A set of such electronic devices can be congregated into a virtual workspace. Another set of electronic devices can also be congregated into another virtual workspace. Each of the virtual workspaces can optionally communicate through a network, such as the Internet, an intranet, or an ad hoc network.

A user might choose to access data existing on one of the electronic devices in a virtual workspace associated with the user or in a virtual workspace associated with another user. The present invention allows an electronic device to be selected, from all of the electronic devices in virtual workspaces associated with a user or users, in order to present the data to the user. The selected electronic device is selected based on a number of predetermined criteria and one or more data formats associated with the data.

A virtual workspace can beneficially provide a persistent and coherent presentation of data and make it appear as if one computing platform is being used. For example, when a user connects a set of electronic devices together, and accesses certain data under certain conditions, the data should be presented on one or perhaps several electronic devices. As long as the data, conditions, and electronic devices do not change, then the data should be presented on the same one or several devices. Thus, a persistent and coherent presentation of data may be provided with embodiments of the present invention.

Figure 1:
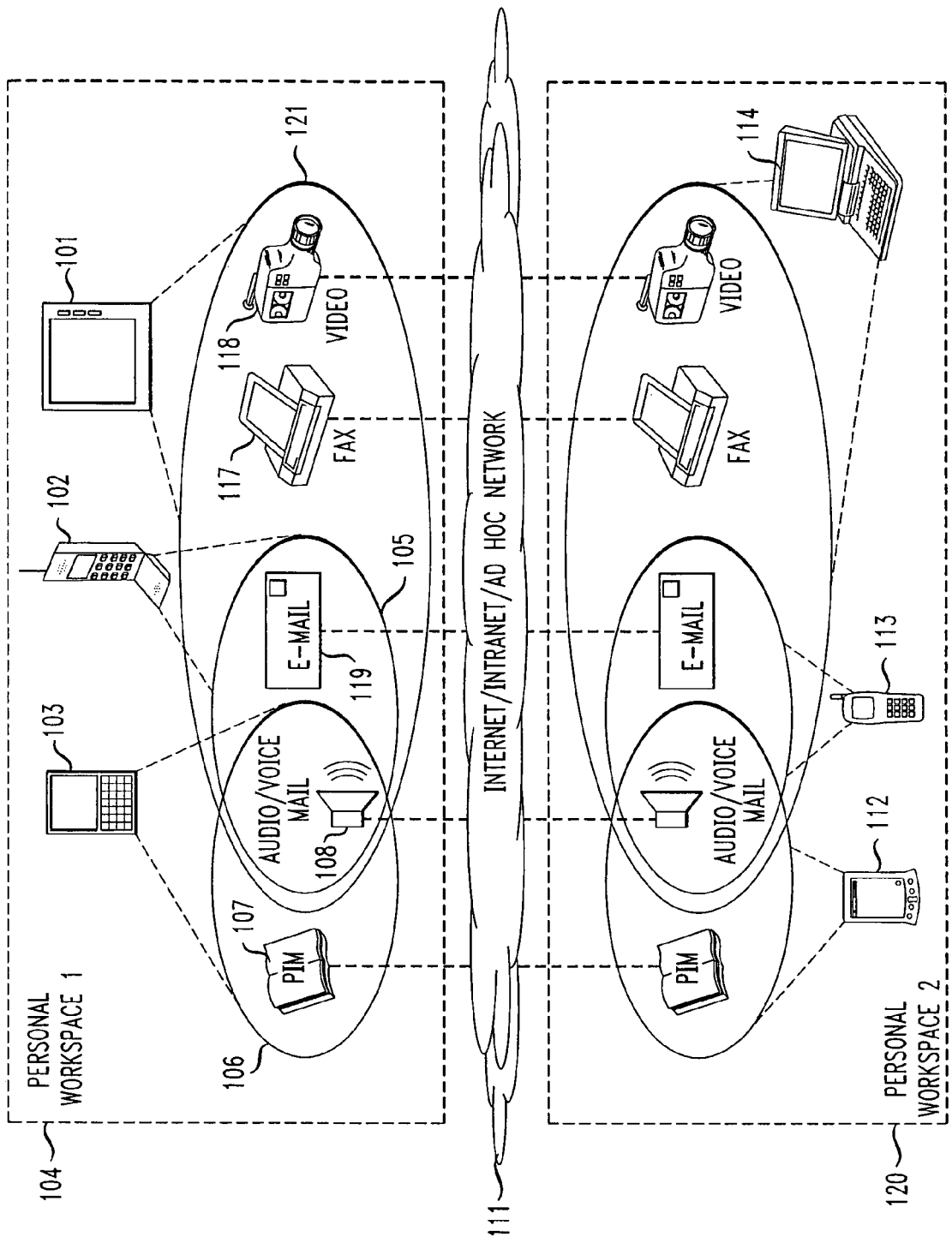
FIG. 1 is an illustration of two sets of electronic devices communicating through a network, where each set is grouped into a personal workspace, in accordance with a preferred embodiment of the invention.

Turning now to FIG. 1, an illustration is shown of two sets of electronic devices communicating through a network 111. Each set of electronic devices is grouped into a personal workspace 104, 120. The set of electronic devices in personal workspace 104 comprises tablet computer 101, cellular phone 102 and PDA 103 (collectively, electronic devices 101 through 103). The set of electronic devices in personal workspace 120 comprises PDA 112, cellular phone 113 and laptop 114 (collectively, electronic devices 112 through 114).

A person carrying multiplicity of electronic devices 101 through 103 may desire a persistent and coherent workspace 104 among those electronic devices. In order to provide the persistent and coherent workspace 104, the electronic devices 101 through 103 should collaborate amongst themselves to share data and resources, beneficially forming one virtual computing platform. For this person, the personal workspace 104 should provide what the person would need in completing his or her task conveniently. It is beneficial that these electronic devices 101 through 103 communicate amongst themselves and provide a persistent presentation regardless of whichever electronic device is used. It is also desirable to route the data to the electronic device that is considered a "best" electronic device to present the data.

In one embodiment of the present invention, the "best" electronic device is defined by criteria including data types for the data, user preferences, presentation capabilities of the electronic device, and display capabilities of the electronic device. For example, PDAs 103, 112 may be capable of presenting (e.g., as shown by reference 106) display calendar and address book data, entitled personal information manager (PIM) information 107, and voice mail 108. Meanwhile, cellular phones 102, 113 may be capable of presenting (e.g., as shown by reference 105) the voice mail 108 and a simple e-mail 119. On the other hand, a tablet computer 101 and a laptop computer 114 may be capable of presenting (e.g., as shown by reference 121) data such as the voice mail 108 and a simple e-mail 119 and more computationally intensive data such as FAX 117 and video 118.

Based on user preferences and the display and presentation capabilities of electronic devices 101 through 103, the data in PIM information 107, voice mail 108, e-mail 119, FAX 117 and video 118 are routed in the personal workspace 104 to one or more selected electronic devices. This routing is preferably dynamic, as current conditions may meet certain criteria used to select an electronic device, but future conditions may meet other criteria used to select a different electronic device. For instance, if a user is using tablet computer 101, the tablet computer 101 may be selected as the selected electronic device in order to present the audio voice mail 108. If the user powers off the tablet computer 101, the PDA 103 can then be used to present the audio voice mail 108.

A second person, carrying his or her own set of personal electronic devices 112 through 114, will have his or her own personal workspace 120. In the personal workspace 120, each electronic device 112 through 114 beneficially acts to handle a specific task.

When the personal workspace 104 and the personal workspace 120 need to communicate, they should be connected first. A subset of electronic devices 101 through 103 carried by the first person may be connected to a subset of electronic devices 112 through 114 carried by the second person via network 111, which can be the Internet, an intranet, a direct connection created by forming an ad-hoc network, or any other network. When these two personal workspaces 104, 120 are connected, each personal workspace 104, 120 preferably acts as one entity and the two personal workspaces 104, 120 determine the "best" electronic device of the electronic devices 101 through 103 and 112 through 114 by using certain criteria. Even using limited available connectivity, each personal workspace 104, 120 dynamically can determine an appropriate route to the best electronic device based on routing criteria comprising conversion of the data and routing capability to the electronic device.

Another example will now be given. The cellular phone 113 may be the best electronic device to present PIM information 107 from PDA 103, while tablet computer 101 may be the best electronic device to present presentation charts (not shown) from laptop computer 114. These data are routed to the cellular phone 113 and tablet computer 101 after, in one embodiment, each of the electronic devices 101 through 103 and 112 through 114 examines user preferences for each user and device capabilities, the latter including, for example, display capabilities, video capabilities, and audio capabilities. However, PDA 103 might not be able to directly communicate with cellular phone 113. Similarly, the laptop computer 114 might not be able to directly communicate with the tablet computer 101.

Assume that, however, PDA 103 can communicate with tablet computer 101, and that the tablet computer 101 is connected to the cellular phone 113. In this case, the PDA 103 can use the tablet computer 101 as a proxy to route data to the cellular phone 113. In this example, if the PIM information 107 from the PDA 103 is not understood by the cellular phone 113, but the tablet computer 101 happens to understand the format required by both the PDA 103 and the cellular phone 113, the tablet computer 101, which is being used as a proxy router, may also perform conversion of the data format on the PIM information 107 as well. On the other hand, if the tablet computer 101 does not understand the data format of the PIM information 107 but the cellular phone 102 does understand the data format, the cellular phone 102 can act as a data converter. Therefore, the PIM information 107 is routed to the cellular phone 102 for data conversion before the PIM information 107 is routed to the tablet computer 101.

By the same token, assume that the laptop computer 114 is not connected to the tablet computer 101. In this case, the laptop computer 114 will attempt to use the PDA 112 as a proxy to communicate with the tablet computer 101, providing that the PDA 112 is connected to the laptop computer 114. On the other hand, if the laptop computer 114 can directly communicate to the tablet computer 101, the laptop computer 114 can then communicate directly with the tablet computer 101. Furthermore, if the communication requires conversion of the data format, an appropriate data converter will be searched either within the same workspace or on another workspace and data can be routed through the data converter as described earlier. It is also possible that more than one electronic device is involved in conversion of the data.

Additionally, although not shown in FIG. 1, data may contain multiple data formats. For instance, video 118 may contain both audio data and video data. The audio data could be routed to the laptop 114, while the video data could be routed to the tablet computer 101.

Figure 2:
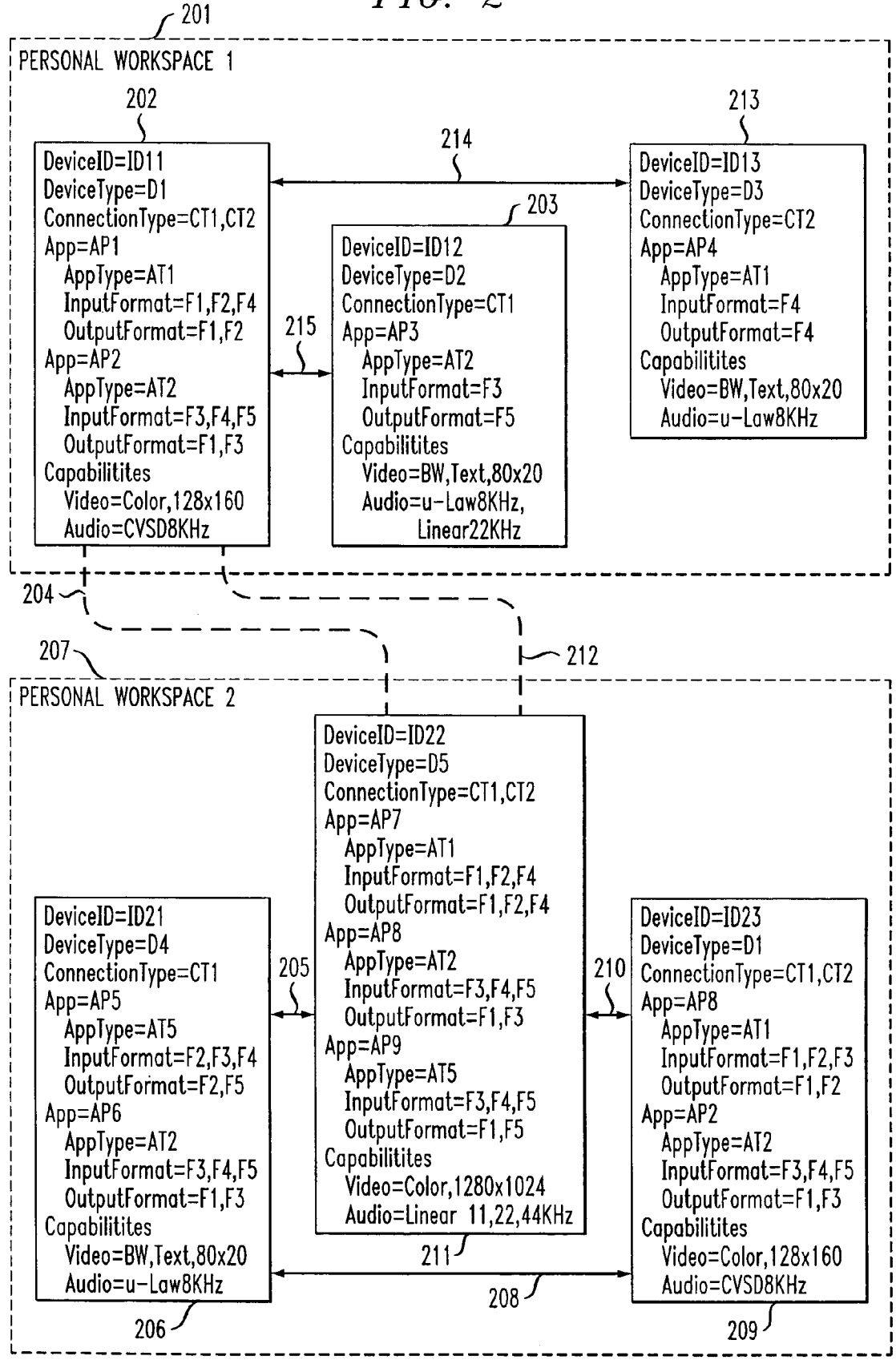
FIGS. 2 through 4 are block diagrams used to illustrate exemplary characteristics and connections for electronic devices in personal workspaces, in accordance with a preferred embodiment of the invention.

Referring now to FIG. 2, two personal workspaces 201, 207 are shown. Personal workspaces 201, 207 are used to illustrate exemplary characteristics and connections for electronic devices 202, 203, 213 in personal workspace 201 and electronic devices 206, 211, and 209 in personal workspace 207.

In this example, three electronic devices 202, 203, 213, forming the first personal workspace 201, are connected amongst themselves through the electronic device 202, having device ID 11. In other words, the electronic device 202 with device ID 11 is acting as a router for both the electronic device 203 with device ID 12 and the electronic device 213 with device ID 13. The connection type for connection 215, which connects the electronic devices 202 and 203, is CT1. The connection type for connection 214, which connects electronic devices 202 and 213, is CT2. On the other hand, on the second personal workspace 207, every electronic device is connected to all other electronic devices 206, 211, and 209 within the same workspace via the connections 205, 208, and 210. The connection types for connection 210 between electronic device 211 with device ID 22 and electronic device 209 with device ID 23 can be either CT1 or CT2. The connections 205, 208 to electronic device 206 with device ID 21 are CT1 type.

The electronic device 202 and the electronic device 209 are D1 type electronic devices and support a connection type of CT1 and CT2 and run AT1 type and AT2 type applications. The AP1 application is the AT1 type of application and supports input formats of F1, F2 and F4 and output format of F1 and F2. The AP8 application is also the AT1 type of application and supports input formats of F1, F2 and F3 and output formats of F1 and F2 while the AP2 application is the AT2 type of application and supports input format of F3, F4 and F5 and output format of F1 and F3. The electronic device 202 has a color display with 128×160 pixel resolution and also capable of supporting audio format Continuous Variable Slope Delta Modulation (CVSD) 8 KHz. These features of the electronic devices 202, 203, 213, 206, 211, and 209 are tabulated in FIG. 2.

In FIG. 2, the first personal workspace 201 is connected to the second personal workspace 207 through the electronic device 202. The electronic device 202 is connected to the electronic device 211 and the electronic device 209 using the connections 204 and 212, respectively, each having a connection type of CT1 or CT2. Data can be routed through the connections 204 and 212.

Figure 3:
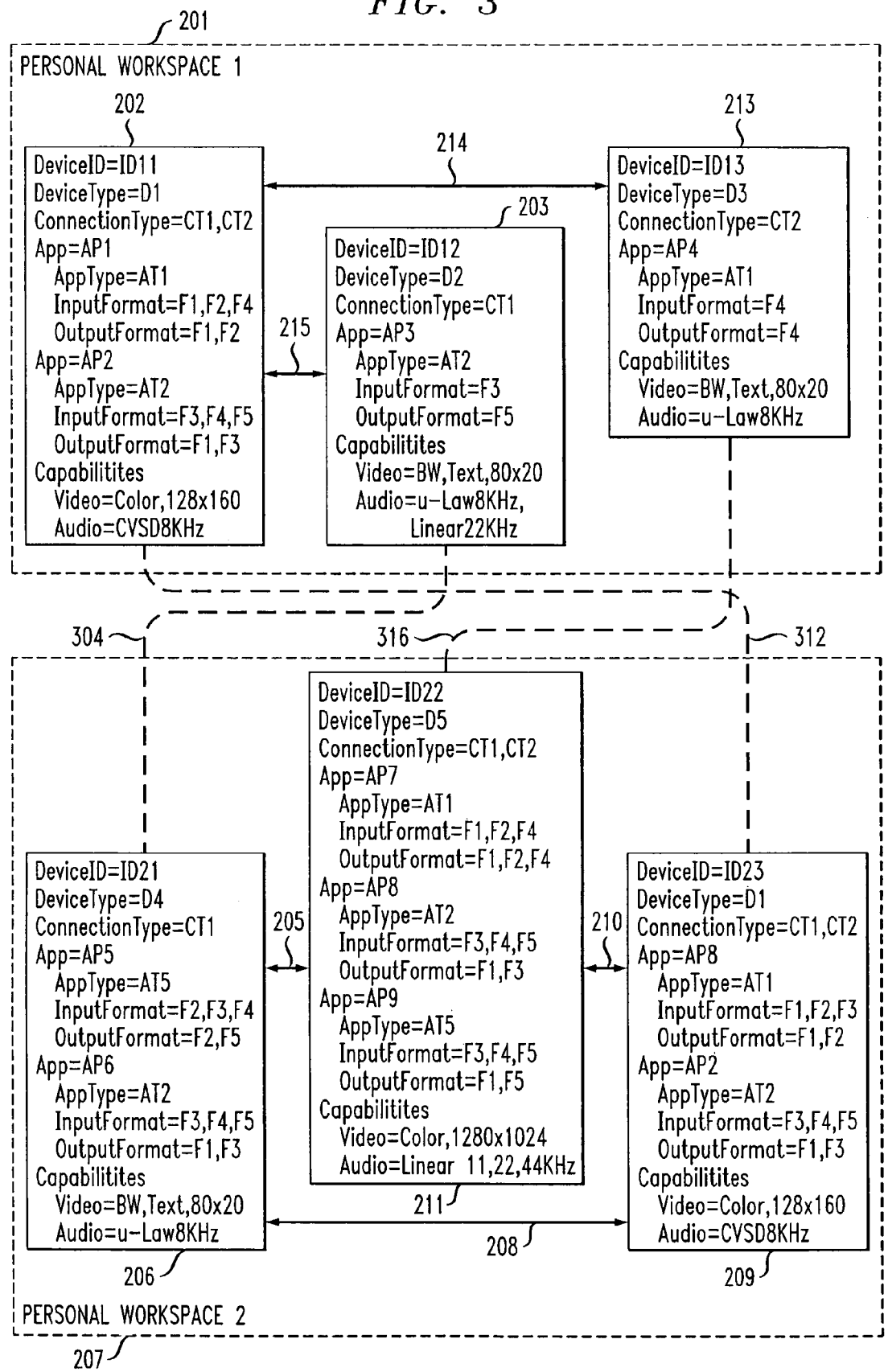
Figure 4:
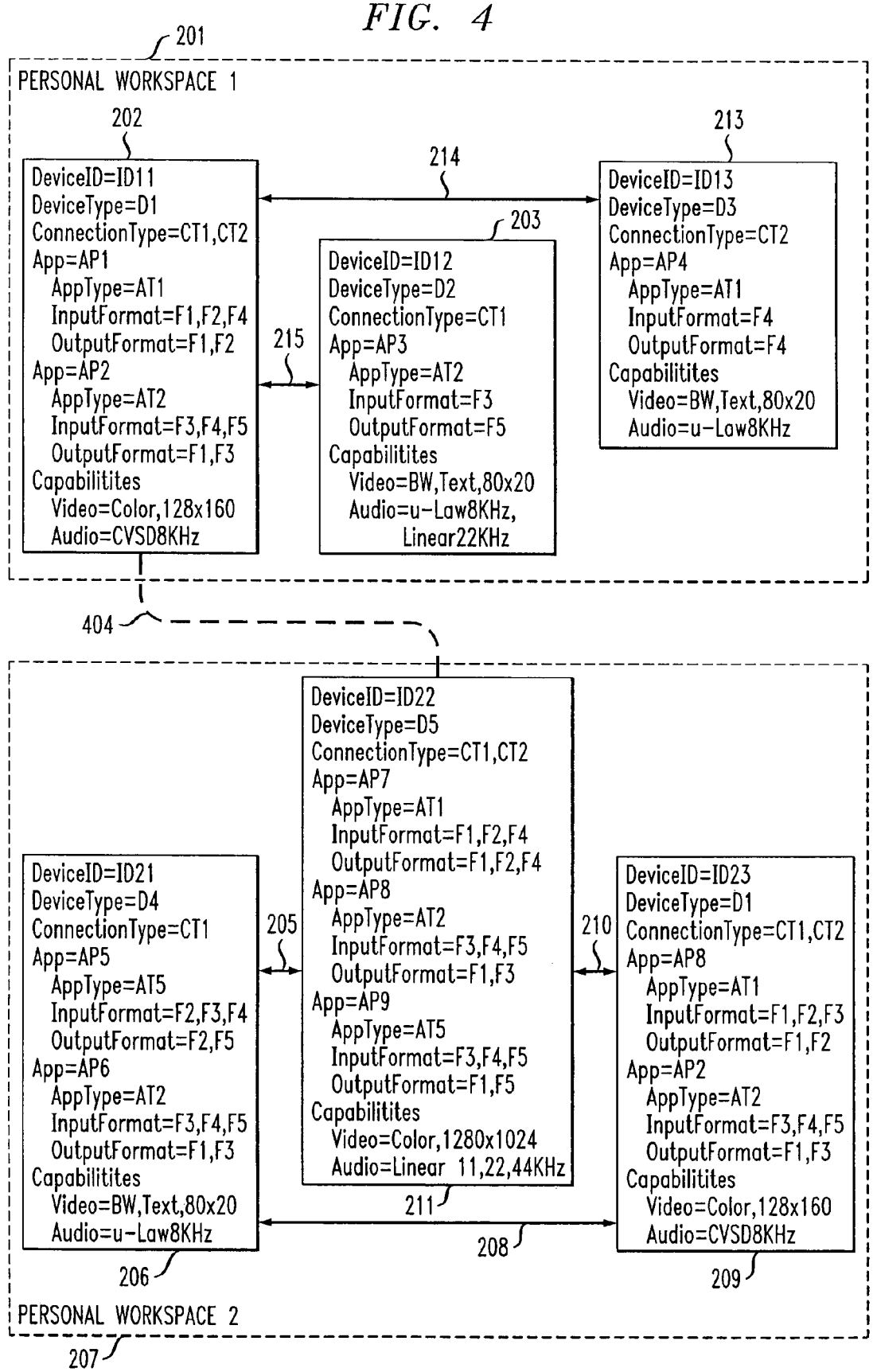

Turning now to FIG. 3, the workspaces 201 and 207 are shown in a different configuration. FIG. 3 has three connections 304, 312, 316 between two workspaces 201 and 207. In FIG. 3, data can be routed through connections 304, 312, 316. Which route is chosen can depend on, for example, the selected electronic device, whether data conversion is needed, and the connection type. In FIG. 4, the workspaces 201 and 207 have only one connection 404, between them. In the example of FIG. 4, all data passed between the workspaces 201, 207 is routed through the connection 404.

Figure 5:
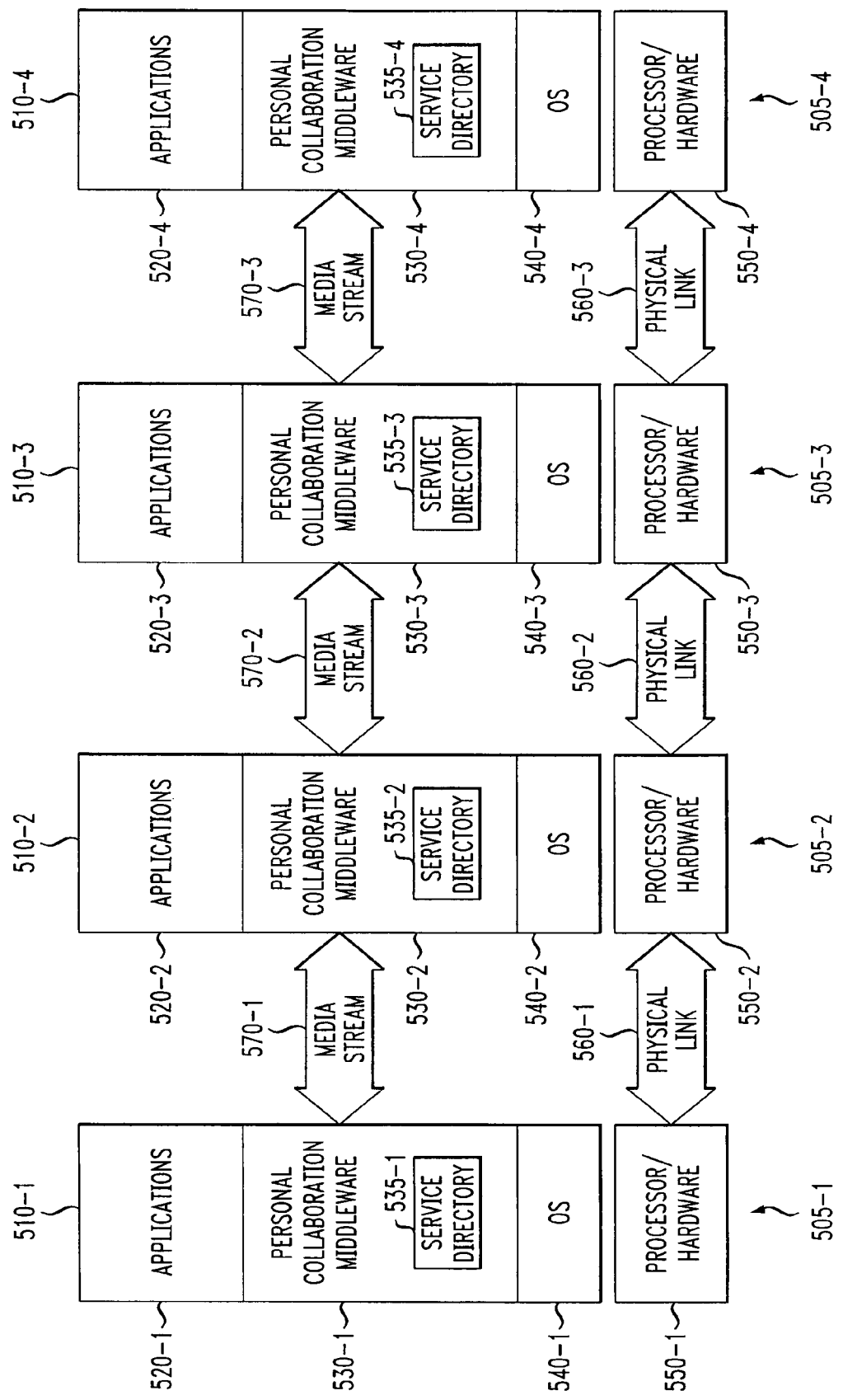
FIG. 5 is a block diagram of an example of four electronic devices in a workspace communicating in accordance with a preferred embodiment of the invention.

Turning now to FIG. 5, a diagram of four electronic devices 505-1 through 505-4 is shown. Each electronic device 505 comprises a software stack 510 and a processor/hardware portion 550. Each processor/hardware portion 550 may comprise solely a processor, hardware suitable for embedding and implementing instructions as well as communicating with other processors/hardware portions 550, or some combination of processor and hardware. Additionally, as shown in FIG. 5, processor/hardware portion 550 also comprises communication devices (not shown) to provide physical links 560. Each software stack 510 comprises a number of applications 520, a personal collaboration middleware layer 530, and an operating system (OS) 540. Each personal collaboration middleware 530 comprises a service directory 535. Electronic devices 505-1 and 505-2 pass data through a media stream 570-1 over the physical link 560-1. Similarly, electronic devices 505-2 and 505-3 pass data through a media stream 570-2 over the physical link 560-2, while electronic devices 505-3 and 505-4 pass data through a media stream 570-3 and are connected through a physical link 560-3. In this example, the physical link 560 is a physical hardware connection such as a wireless Ethernet link, while the media stream 570 is the stream of data that are sent at a higher communication protocol layer such as transmission control protocol/Internet protocol (TCP/IP) or even higher such as a hyper-text transfer protocol (HTTP) layer. The higher layer communication is performed over the physical link.

It should be noted that the processor/hardware portion 550 and the software stack 510 can be integrated on one semiconductor device or be separated into multiple semiconductor devices. Moreover, software stack 510 may be implemented through one or more memories, where each memory comprises one or more storage devices. The storage devices may comprise a magnetic or optical disk, random access memory, read-only memory, an electrically erasable read-only memory, flash memory, battery-backed up memory, tape, or other storage. As an example, a memory may comprise read-only memory containing a portion of the OS 540, random access memory (RAM) containing a portion of personal collaboration middleware 530 and another portion of the OS 540, and non-volatile RAM containing the entire software stack 510.

Depending on what features the OS 540 has will depend on what should be implemented in the personal collaboration middleware 530. The personal collaboration middleware 530 performs methods 700, 800, 900, and 1600, described in more detail below, and can contain service directories 535 (as well as user preferences), which are shown in more detail in reference to FIGS. 10 through 15. The personal collaboration middleware 530 enables collaboration between electronic devices 505. Collaboration is an exchange of information between electronic devices in order to route the data to a selected electronic device for presentation purposes, user input purposes, or both. Generally, a first electronic device will send attributes about the first electronic device to a second electronic device in order for the second electronic device to determine whether the first electronic device is the best electronic device to present data. If the first electronic device is the best electronic device to present the data, then the second electronic device transmits the data to the first electronic device. As shown in FIG. 5, attributes for each electronic device are stored in a service directory 535. Additionally, there may be other exchange of information, such as messages.

In this exemplary embodiment, each electronic device 505 is running personal collaboration middleware layer 530 on top of an OS 540, which provides, for instance, the functionality of sharing information and handling data and presenting the information and handling the connection and user preferences in order to implement the present invention. Some of these functions can run in the OS 540 or in the personal collaboration middleware 530 as there is no clear cut boundary between OS 540 and personal collaboration middleware 530 in many workspaces.

Each service directory 535 comprises a number of block nodes, not shown in FIG. 5 but shown in more detail in reference to FIGS. 10 through 15. Broadly, a service directory provides information about how electronic devices 505 are connected and what their capabilities are. Generally, each service directory comprises a number of block nodes (not shown in FIG. 5), where each block node contains information about one of the electronic devices 505. Each block node also comprises link information illustrating how the two electronic devices 505 corresponding to two of the block nodes are connected. Service directories and block nodes are explained in more detail in reference to FIGS. 10 through 15.

In the example of FIG. 5, each electronic device 505 comprises a service directory 535. As explained in reference to FIGS. 10 through 15, each service directory 535 will be slightly different because of the way each electronic device 505 is connected to other electronic devices 505. However, it is possible for there to be one service directory 535 for the electronic devices 505. For example, a single service directory 535 could be stored on electronic device 505-1, and each of the electronic devices 505-2, 505-3, and 505-4 would connect to the service directory 535 stored on electronic device 505-1.

The present invention described herein may be implemented as an article of manufacture comprising a machine-readable medium, as part of software stack 510 for example, containing one or more programs that when executed implement embodiments of the present invention. For instance, the machine-readable medium may contain a program configured to perform steps taken by the personal collaboration middleware 530. The machine-readable medium may be, for instance, a recordable medium such as a hard drive, an optical or magnetic disk, an electronic memory, or other storage device.

Figure 6:
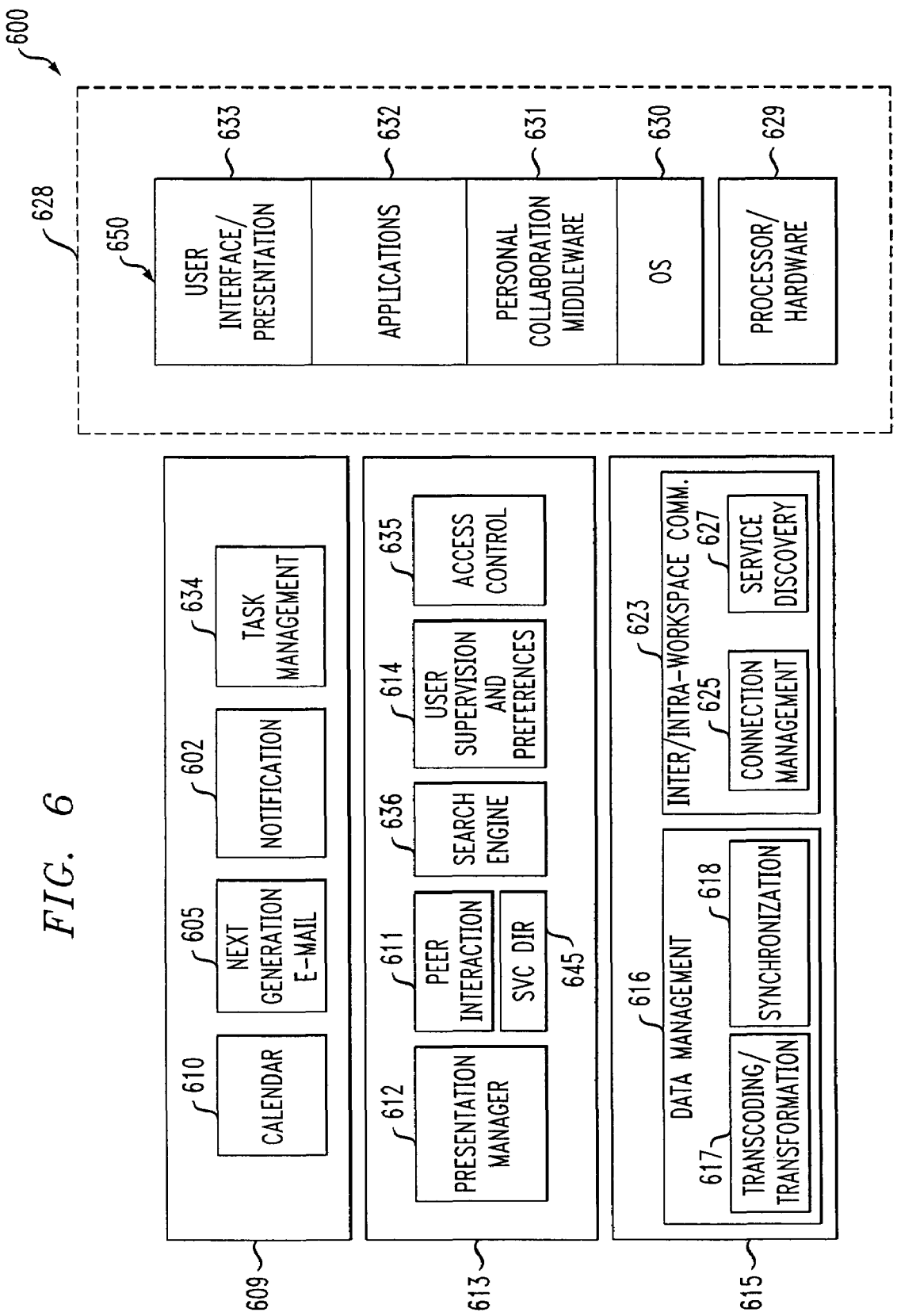
FIG. 6 is a block diagram illustrating software layers showing how an embodiment of the present invention may be implemented.

FIG. 6 is an example of how layers 600 might be structured for one or more electronic devices. Reference 628 shows a high level view of software layers including an OS layer 630, personal collaboration middleware layer 631, an application layer 632, and a user interface and presentation layer 633. The user interface part of the user interface and presentation layer 633 handles user input such as keyboard, mouse, speech recognition, and pen input, and also handles the computer output or response to the user, such as display, printer and speakers. The presentation part of user interface and presentation layer 633 handles the computer output, organizing how to show sets of information to an output device. Additionally, a processor/hardware layer 629 is shown. The processor/hardware layer 629 includes the physical hardware that the electronic devices in a workspace may comprise. This hardware can comprise places where actual data is stored for use, applications are running, and a physical connection is made.

Layer 615 indicates which functions are generally associated with OS layer 630, layer 613 indicates which functions are generally associated with the personal collaboration middleware layer 631, while layer 609 indicates are generally associated with the applications layer 632. However, this is only an example, and some functions associated with one block may, in some implementations, be implemented in another layer. As an example, certain data management functions 616 may be implemented in the person collaboration middleware layer 631 instead of the OS layer 630, if desired.

Each electronic device may be running its own operating system, in OS layer 630. The OS layer 630 may include data management functions 616 that handle data conversion, while the presentation manager 612 that uses the data may run on the personal collaboration middleware layer 631. Data conversion is shown in FIG. 6 as transcoding and or transformation module 617. Transcoding reformats data, generally to convert the data from one screen size and resolution to another screen size and resolution. Transcoding usually requires some "coding," such as signal processing. For instance, an Internet web page meant for a laptop can be transcoded to fit on a much smaller screen for a PDA through scaling. Transformation implies converting data from one data format to another. For example, a document formatted for one word processor can be reformatted to be presented on another word processor.

Data management functions 616 also can include synchronization 618 of data among electronic devices. Furthermore, the OS layer 630 will usually include inter/intra workspace communication manager 623 that handles service discovery 627 and connection management 625. The functions shown in OS layer 630, such as data management 616 and inter/intra workspace communication manager 623, are additional functions that are beneficial and are in addition to convention OS functions such as memory management, file management, scheduling, communication management, and input/output management. Part or all of these functions can be also implemented in the personal collaboration middleware layer 631, as described previously.

On top of these, presentation manager 612, peer interaction manager 611, service directory 645, search engine 636, access control manager 635, and user supervision function and preferences 614 are implemented in layer 613, which corresponds to personal collaboration middleware layer 631. The presentation manager 612 handles how the data should be presented to the user. The peer interaction manager 611 handles the communication with peer electronic devices as well as the remote service invocation and invoking an application when such a remote service request is received. The access control manager 635 verifies whether the service is accessible by the requester of the service or not. The search engine 636 can search the electronic devices in the workspace to determine attributes of the devices and on which electronic device the data is located. The user supervision function and preferences 614 handles user policies and preferences and can contain user preferences.

On top of the personal collaboration middleware layer 631, applications layer 632 exists, as illustratively shown by layer 609. Layer 609 comprises the following applications: calendar 610; next generation e-mail 605; notification 602; and task management 634. These applications can present the data to the user using any selected and capable electronic device within a workspace. In some instances, part of information will be shown in one electronic device while other part will be shown on another electronic device. Preferred and capable electronic devices will be also used to take the user input for the workspace. How each of the functional blocks in FIG. 6 are divided and implemented are not the subject of the invention but FIG. 6 illustrates exemplary functions suitable to allow communication among electronic devices to route data to one or more best fit electronic devices through a data converter, if needed, as in a preferred embodiment of the present invention.

Figure 7A:
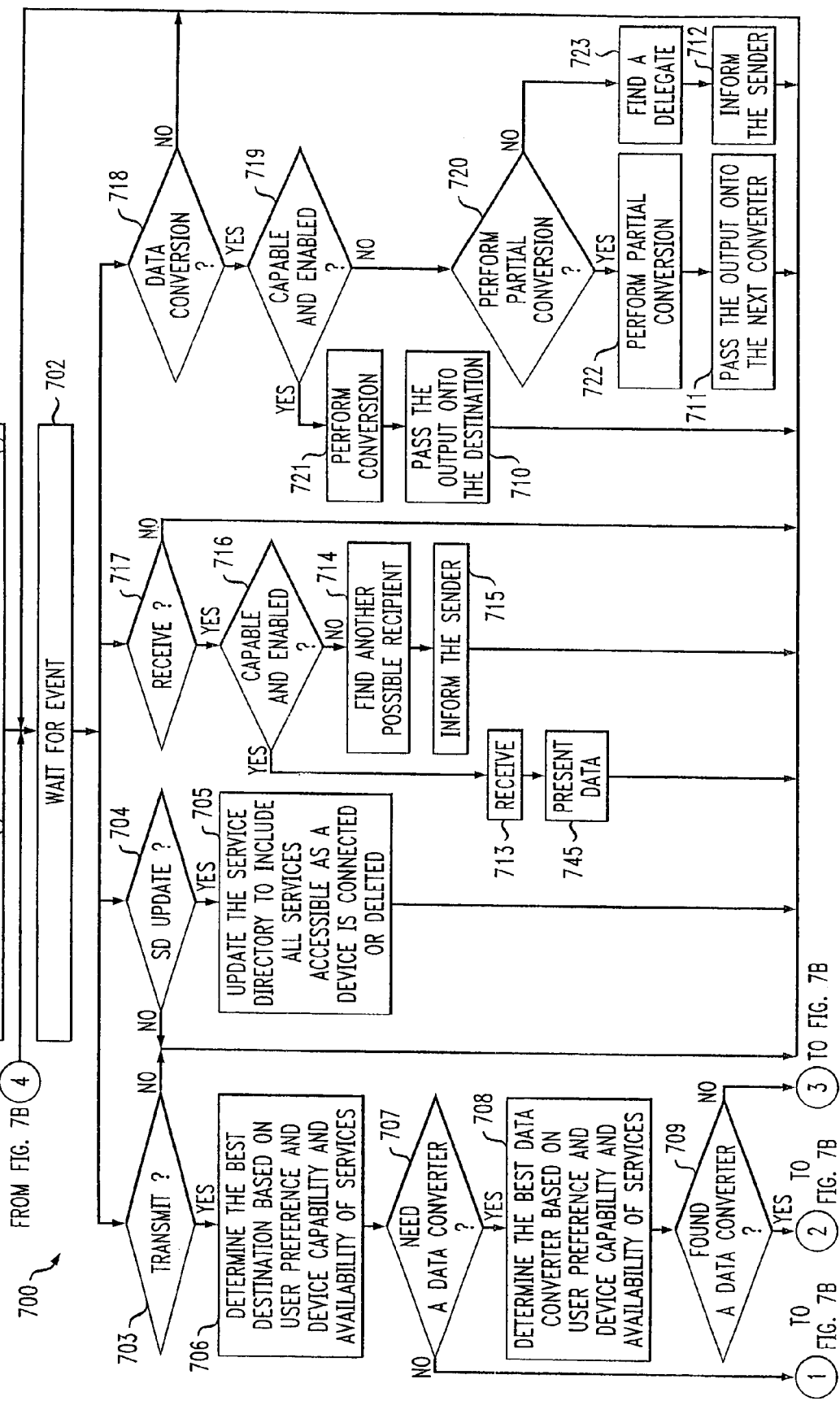

FIGS. 7A and 7B show an exemplary method 700 for selecting an electronic device and dynamic routing of data to the selected electronic device. Method 700 is generally performed by personal collaboration middleware and is shown being executed on one electronic device. Thus, a personal collaboration middleware on one electronic device performs method 700 and can create or modify its service directory, transmit data, convert data, receive data, or perform a combination of these.

Step 702 is a waiting step, where waiting is performed until and event occurs. When an event occurs, the steps 704, 703, 718, and 717 are performed.

Within a personal workspace, each electronic device usually creates a service directory in step 701. Each service directory is called a "block node" for the electronic device. A block node generally contains various attributes such as information describing capabilities of the electronic device, connection types, device types, applications or services that can be provided by the electronic device and access rights for each service. Exemplary service directories and block nodes are shown in reference to FIGS. 10 through 15. Determining the block node may be performed dynamically, as information is requested, or may be performed before information is requested.

A service directory can be as simple a single piece of information such as a phone number that can be read by a address book application, for instance. As a new electronic device enters the workspace or leaves the workspace, the service directory is updated by adding newly available block nodes or removing block nodes, respectively. Whenever an electronic device enters or leaves a workspace, a message is generated by one or more of the electronic devices in the workspace to update service directories (step 704). For example, if an electronic device is powered off, the electronic device can send a message to update service directories. Additionally, polling can be used to remove an electronic device if the electronic device does not answer a poll. Furthermore, if an electronic device has a new service such as an application added, the electronic device can send a message to update service directories.

When there is a service directory update (step 704=Yes), the service directory from a newly joined electronic device or newly updated electronic device is updated to include new block nodes. This occurs in step 705 and method 800 of FIG. 8. Also, if a block node of a service directory is to be deleted, such as when a electronic device leaves a workspace and is unable to communicate with other devices in the workspace or is turned off, the block nodes are deleted in step 705 and the method 900 of FIG. 9. The newly added electronic device or deleted electronic device should also update its own service directory, which also occurs in step 705. If there is no service directory update (step 704=No), the method 700 continues in step 702 to wait for another event. It should be noted that events may be queued.

If there is no request to transmit data from the electronic device (step 703=No), the method 700 continues in step 702 to wait for another event. If there is a request to transmit data from the electronic device (step 703=Yes), in step 706, a "best" destination electronic device is determined based, for instance, on user preferences (as described in reference to FIG. 16), device capabilities, and availability of services. In step 707, it is determined if a data converter is needed. If so (step 707=Yes), a "best" data converter is determined based, for example, on user preferences, device capabilities, and availability of services. This occurs in step 708. In step 709, it is determined if a data converter has been found. If the converter is available on another electronic device, a remote procedure call request can be sent to the other device.

If so (step 709=Yes), a "best" route is determined to the data converter, which is generally an application on a electronic device, based on connection availability and connection requirements. This occurs in step 754. The data is then passed to the data converter. Passing the data includes routing the data through one or more electronic devices until the electronic device with the data converter is reached.

If a data converter is not found (step 709=No), the requester is informed, in step 755, that the requested transmission cannot be performed without an appropriate data converter.

If a data converter is not needed (step 707=No), the "best" route to a destination electronic device is determined based on connection availability and connection requirements. This occurs in step 751. In step 753, the data is passed to the destination electronic device. Passing the data includes routing the data through one or more electronic devices until the electronic device selected as the destination electronic device is reached.

In step 718, it is determined if data conversion is needed. This step may be performed by determining if a remote procedure call has been received to perform the conversion on behalf of the other electronic device. For example, the JAVA language allows remote procedure call (RPC) requests. The conversion can also be requested locally in the electronic device that contains the data if the data converter is available locally. If data conversion is not needed (step 718=NO), the method 700 continues in step 702 to wait for another event. If so (step 718=Yes), in step 719, it is determined if the electronic device can actually perform the data conversion through a determination as to whether an application to be used to perform the data conversion is capable of performing the conversion and whether the application is enabled. If step 719 is No, then step 720 determines whether a particular data conversion may be performed. If so (step 720=Yes), the application performs a partial conversion (step 722) and the output of the data conversion is passed to the next data converter (step 711). If not (step 720=No), the electronic device finds a delegate data converter (step 723) and informs the sender of the data (step 712) of the delegate data converter.

If step 719=Yes, the data conversion is performed by the application in step 721, and the output of the data conversion is passed to the destination electronic device in step 710. The method 700 returns to step 702 to wait for the next event.

In step 717, it is determined if data is to be received. If not (step 717=NO), method 700 continues in step 702. If data is to be received (step 717=Yes), it is determined if an application to present the data is capable of presenting the data and enabled in order to present the data. This occurs in step 716. If step 716=Yes, the data is received (step 713) and presented (step 745). If step 716=No, then another possible recipient is found (step 715), and the sender is informed of the possible recipient (step 715). The method 700 returns to step 702 to wait for another event.

Figure 8:
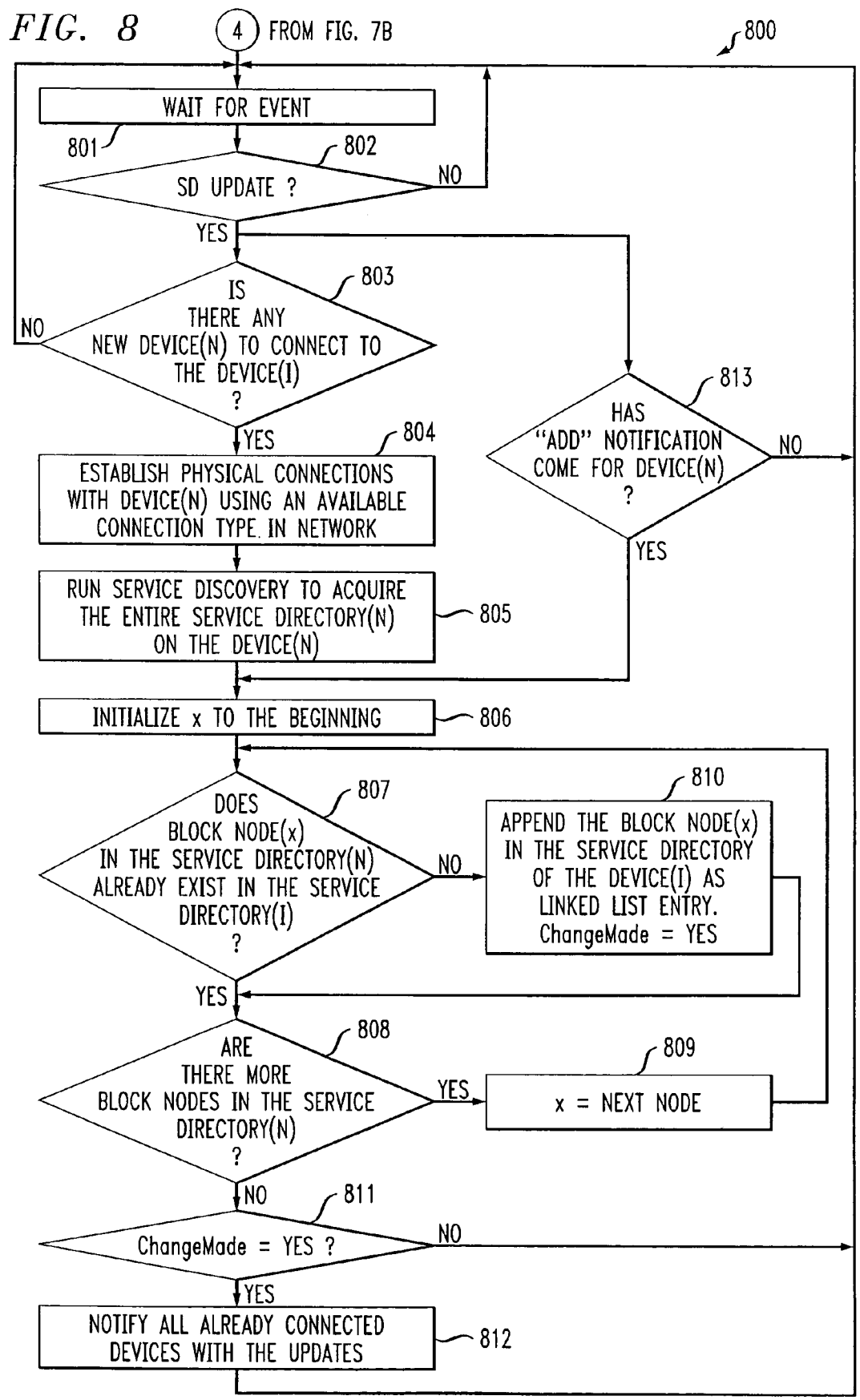
FIG. 8 is a flowchart of an exemplary discovery directory set up method for adding newly available service directories.

Turning now to FIG. 8, an exemplary discovery directory set up method 800 is shown for adding newly available service directories. FIG. 8 represents steps 702, step 705 and the update connections that are added or modified (part of step 705). Method 800 is also generally performed by a personal collaboration middleware in an electronic device. Step 801 is a waiting step shown in step 702, where an event causes further action. In step 802, it is determined whether a service directory update is needed. If not (step 802=No), the method 800 continues in step 801. The electronic devices that are directly connected to newly added electronic devices will generally perform steps to enable connections between the electronic devices. For example, in step 803, it is determined if there is a new device (i.e., "device(N)") to connect to the device performing method 800 (i.e., "device (I)"). If not (step 803=No), then the method 800 continues in step 801. If so (step 803=Yes), then a physical connection is established between the current device and the new device using an available connection type within a network if the physical connection is not already made. Service discovery is run in step 805 using any available service discovery protocols. Such protocols could include a link level service discovery, like Bluetooth service discovery protocol if the connection type happens to be Bluetooth wireless connection, or any higher layer service discovery protocol like service location protocol (SLP), Jini, Salutation, or universal description, discovery, and integration (UDDI) if transmission control protocol/Internet protocol (TCP/IP) is used.

In step 813, it is determined if an "add" notification has been received for the newly added electronic device. If so (step 813=Yes), the method 800 continues in step 806. If not (step 813=No), the method continues in step 801. Steps 812 and 813 provide for a messaging system type of notification for addition of electronic devices and services.

It is possible that a newly added electronic device is connected to other electronic devices and therefore includes services from those other electronic devices in the service directory. As the result, there could be multiple block nodes in the service directory of the newly added electronic device. It is, therefore, beneficial to enumerate all block nodes from the service directory of the newly added electronic device and add any new services that are available directly or indirectly. In order to do this, steps 806 through 810 are performed. In step 806, a variable x is initialized to the beginning, which is generally zero in the case of an array index or the beginning part of a linked list. In step 807, it is determined whether a block node in the service directory of the newly added electronic device already exists in the service directory of the current electronic device performing method 800. If not (step 807=No), the block node for the newly added electronic device is appended to the service directory of the current electronic device as a linked list entry. This occurs in step 810. The method continues again in step 808, which is also reached when step 807=Yes. Step 808 determines if there are more block nodes in the service directory for the newly added electronic device. If so (step 808=Yes), the variable x is incremented in step 809 and method 800 continues in step 807. The newly added electronic device should also go through the same procedure to add all newly available services directly or indirectly.

All other electronic devices that are indirectly connected to the new electronic device will generally get notifications from directly connected electronic devices as new services are added to the directly connected electronic devices. This is beneficially performed as follows. In step 808, when there are no more block nodes in the service directory of the newly added electronic device (step 808=NO), if a change to the current service directory has been made (step 811=Yes), then all electronic devices connected in the current workspace are notified with the updates (step 812). If there are no changes to the current service directory (step 811=No), then the method 800 continues in step 801.

Figure 9:
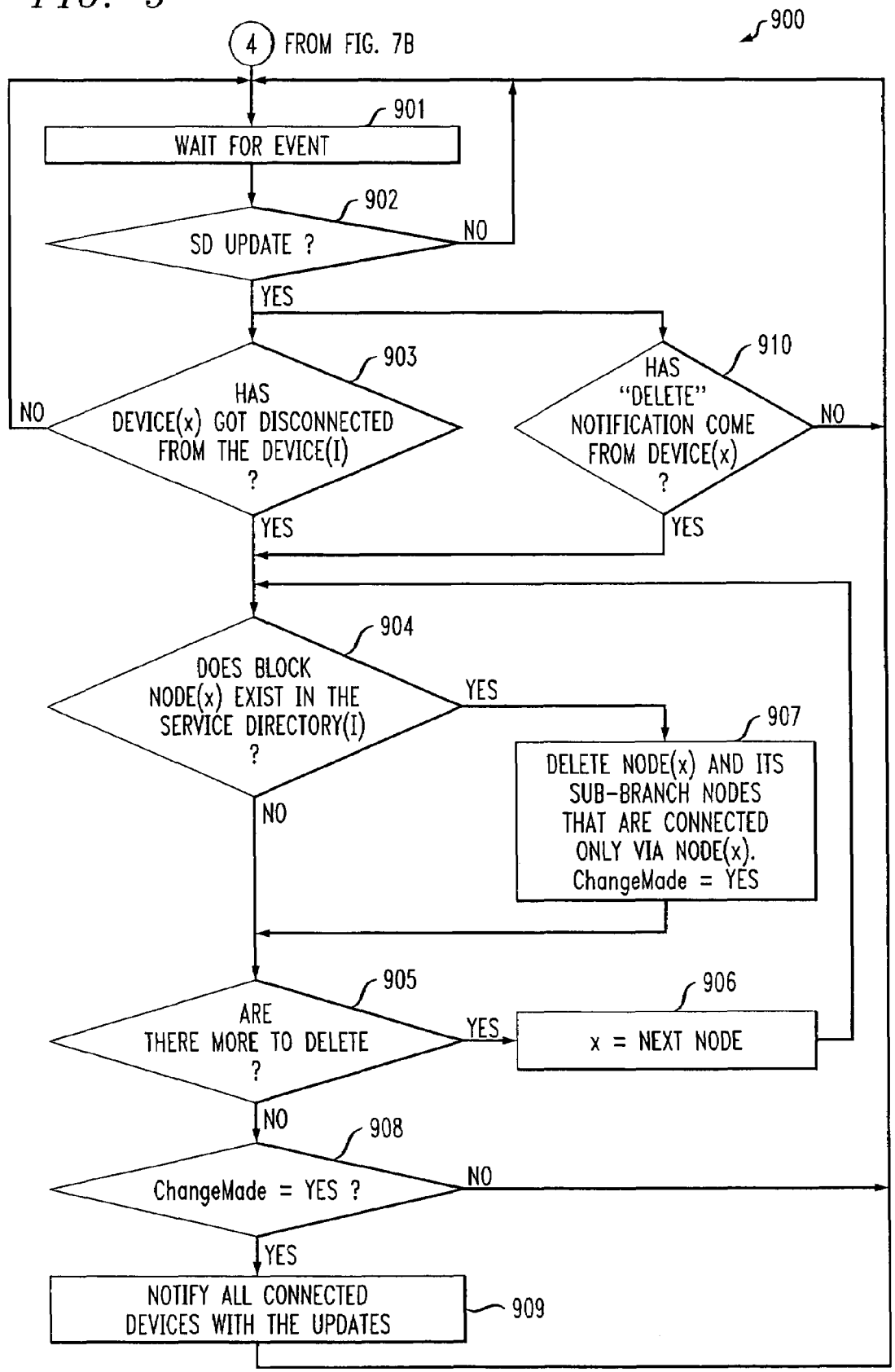
FIG. 9 is a flowchart of an exemplary discovery directory set up method for deleting no longer available service directories.

Turning now to FIG. 9, an exemplary discovery directory set up method 900 is shown for deleting service directories that are no longer available. FIG. 9 represents step 702, step 704 and the part of step 705 referring to updating service directories due to deletion of electronic devices. As an electronic device leaves the personal workspace, any services that were available either directly or indirectly via the leaving electronic device must be eliminated from the service directory. Step 901 is a waiting step also shown in step 702 of FIG. 7, which waits for an event. In step 902, it is determined if a service directory update has occurred. If not (step 902=No), the method 900 continues in step 901. If so (step 902=Yes), the electronic device that was connected directly to the leaving electronic device will detect that the electronic device is disconnected (step 903), and other electronic devices that were indirectly connected will get delete notifications in step

910. The detected electronic devices will remove the block nodes through steps 904 and 907, and will notify other electronic devices through steps 908 and 909. It is possible that there could be services that were only available form other electronic devices indirectly through the electronic device that was disconnected. Therefore, every electronic device should examine its service directory for whether any block nodes were available through the disconnected electronic device. This occurs in steps 905 and 906.

Since every electronic device should eventually include the same number of block nodes after the service directory methods 800 and 900 are completed, it is also possible to employ a central service directory server where newly added services or deleted services or both will be reported and maintained. Such central service discovery directory server model is more appropriate for many service discovery protocols such as UDDI, for instance. A possible limitation with such approach is that the connection to the central discovery directory server should be maintained all the time whether the central discovery directory server is within the personal workspace or in the remote location. Sometimes, redundant central discovery directory servers are employed to make sure at least one of them is connected in the dynamic environment. In case the central service directory server is employed, the physical link connection information should be added to the service attributes so that an electronic device can determine the optimal route to the service.

Figure 10:
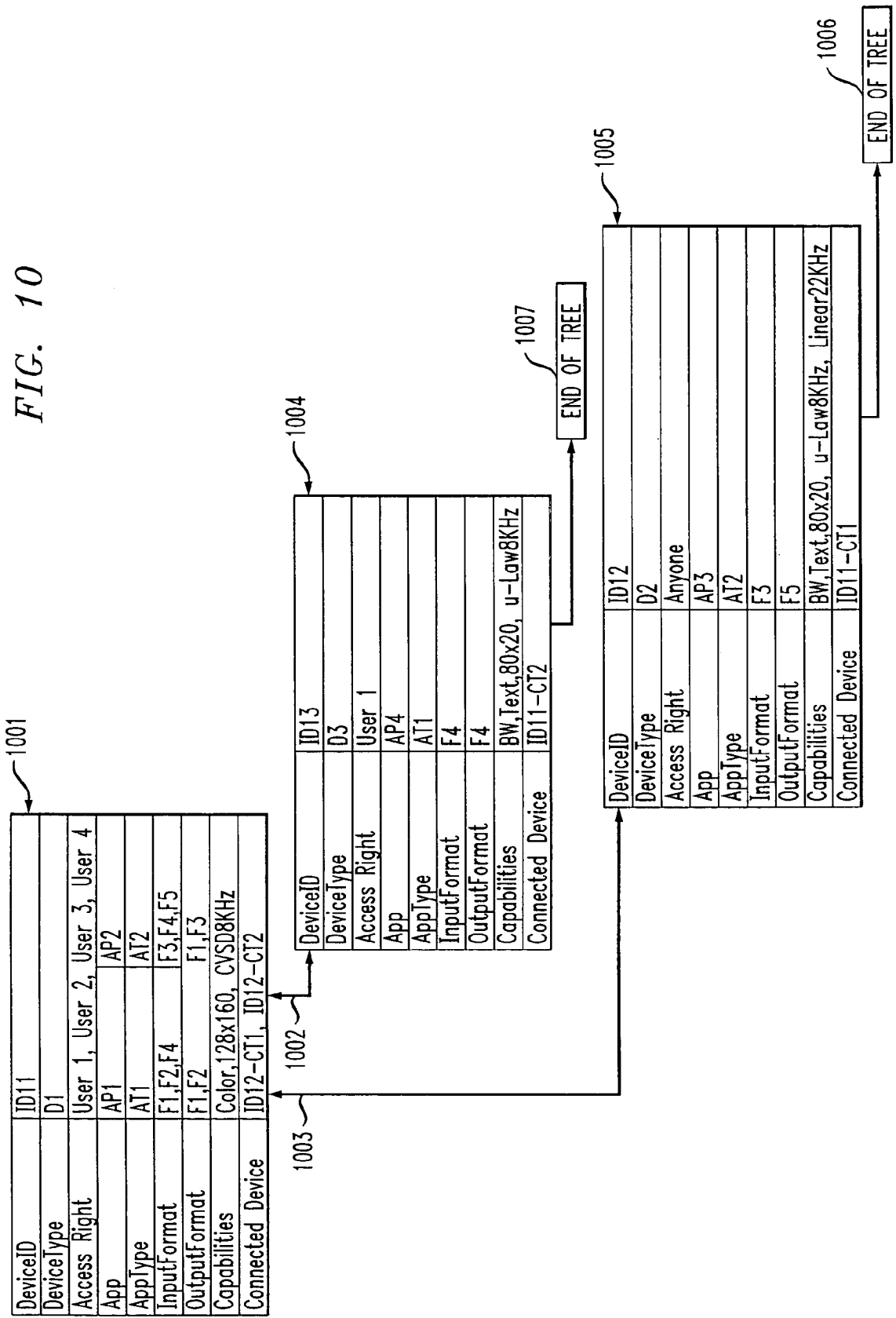
FIGS. 10 through 15 depict exemplary service directories created in electronic devices with identifications of 11, 12, 13, 21, 22, and 23, respectively, in FIGS. 2 through 4.

FIG. 10 illustrates an exemplary service directory created in the electronic device 202 having device ID 11 in the personal workspace 201 of FIGS. 2 through 4. The block node 1001 is created for the services that are available within the electronic device 202. The block node 1004 and the block node 1005 are directly connected services as shown by the link information 1002, 1003. The block nodes 1004 and 1005 do not provide any other indirectly available services as indicated with the "end of tree" markers 1006, 1007.

Figure 11:
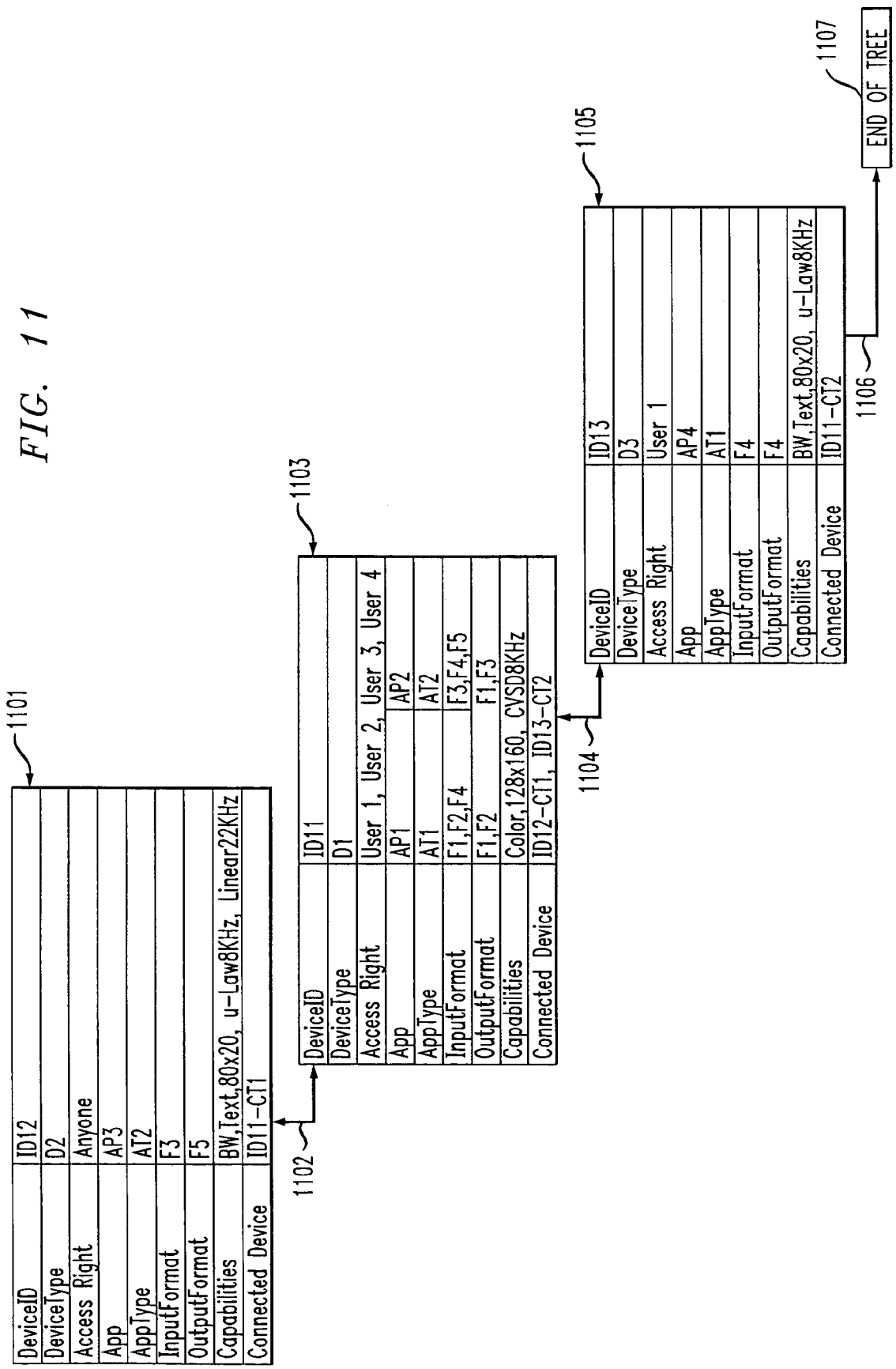

Similarly, FIG. 11 shows an exemplary service directory created in the electronic device 203 having device ID 12 shown in FIGS. 2 through 4. The first block node 1101 is for the services of electronic device 203, while the second block node 1103 is for directly connected services as shown with link information 1102. The third block nodes 1105 is for indirectly available services via the link information 1104, and there are no further indirectly available services beyond the those blocks as indicated by the links to the end of tree markers 1106 and 1107. This implies that if the middle block node 1103 is eliminated, the third block node 1105 will be also eliminated automatically. However, in the second workspace 207, using the same examples, the main difference would be that all services are directly connected. Therefore, there is no end of tree marker. As the result, even if one electronic device leaves the workspace, there will not be any indirectly available services that will be eliminated subsequently.

Figure 12:
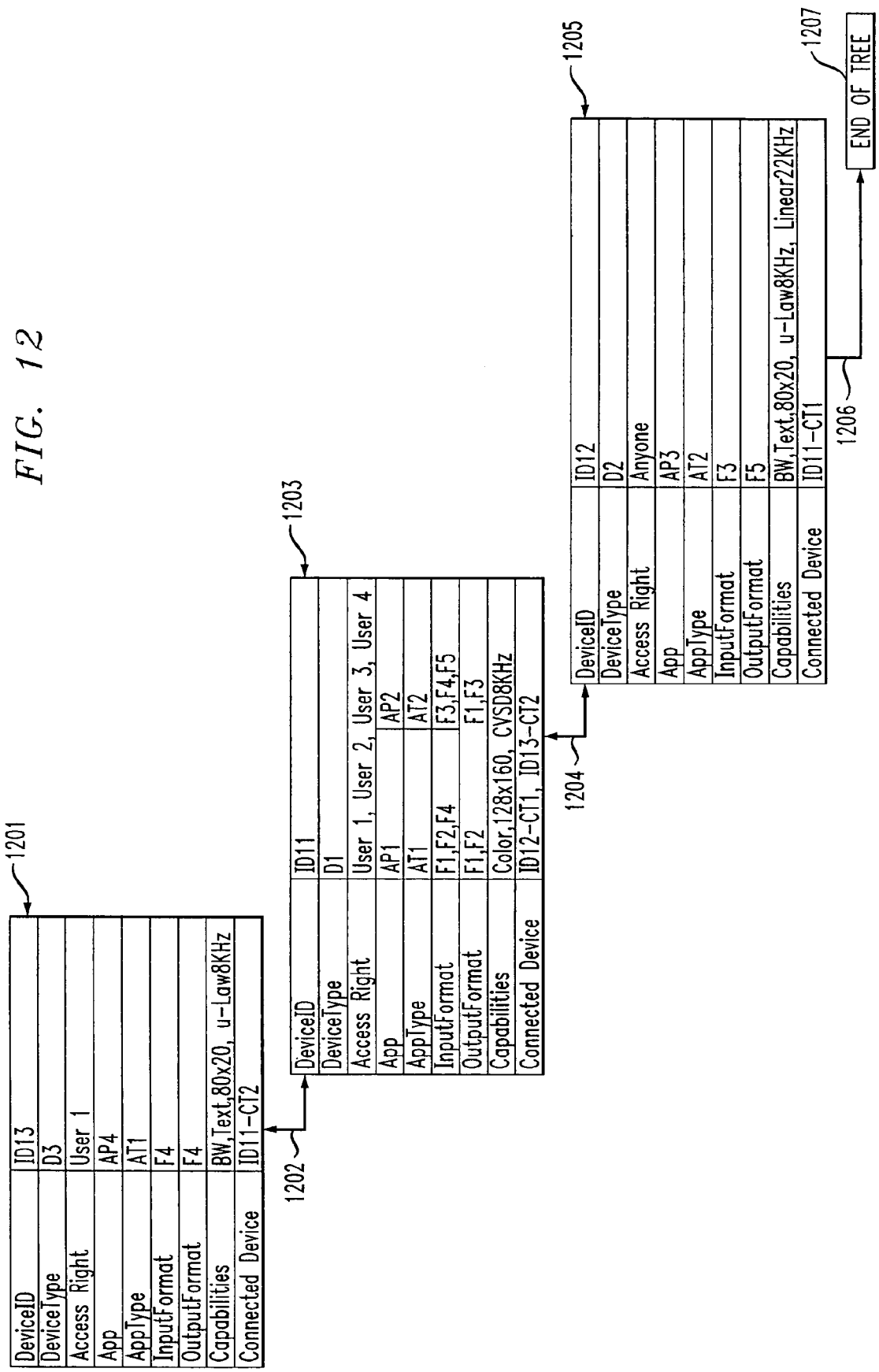

FIG. 12 shows an exemplary service directory created in the electronic device 213 having device ID 13 shown in FIGS. 2 through 4. The first block node 1201 is for the services of the electronic device 213, while the second block node 1103 is for directly connected services as shown by link information 1202. The third block node 1205 is for indirectly available services via the link information 1204, and there are no further indirectly available services beyond the those blocks as indicated by the links to the end of tree markers 1206, 1207.

Figure 13:
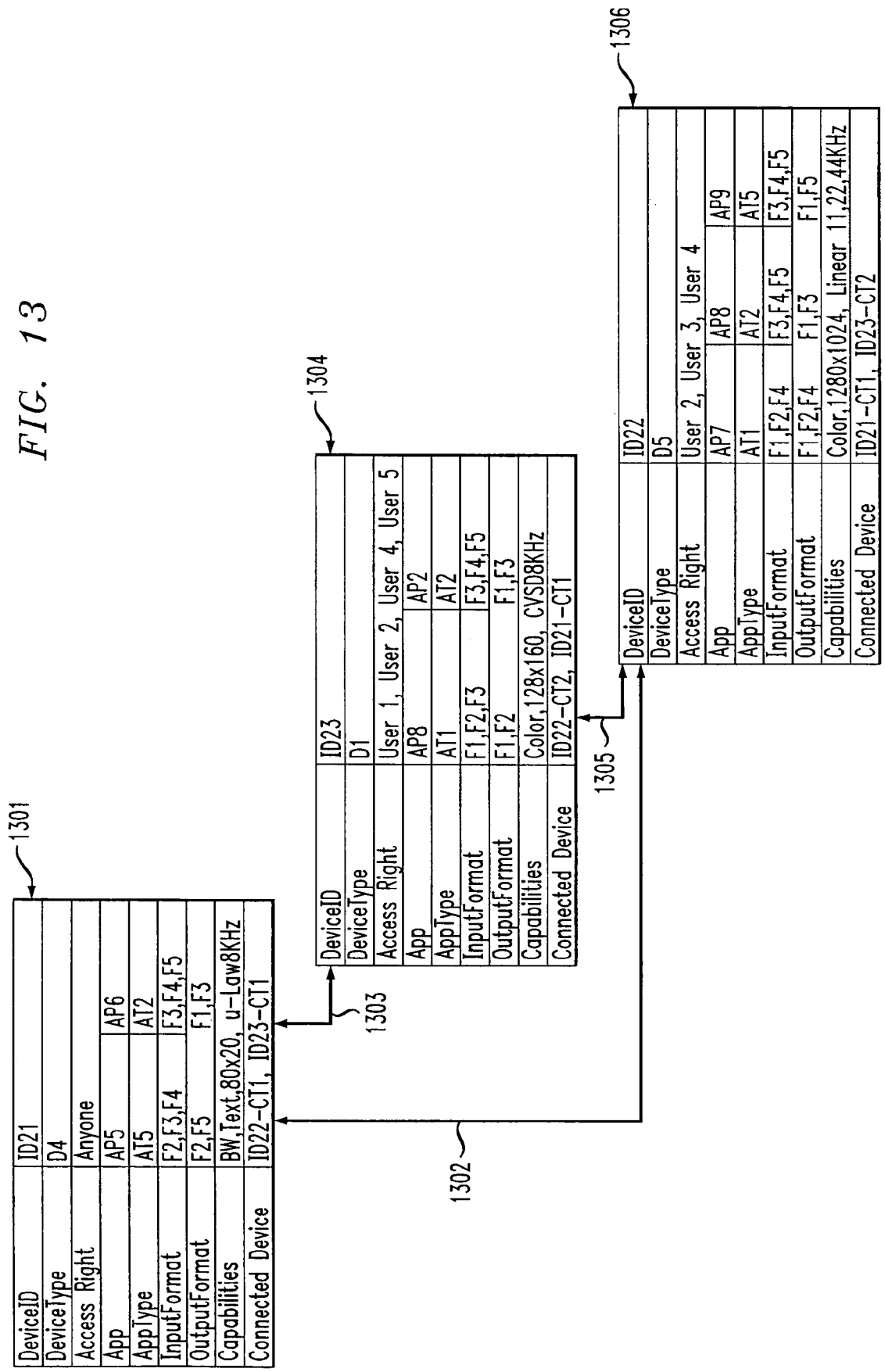
Figure 14:
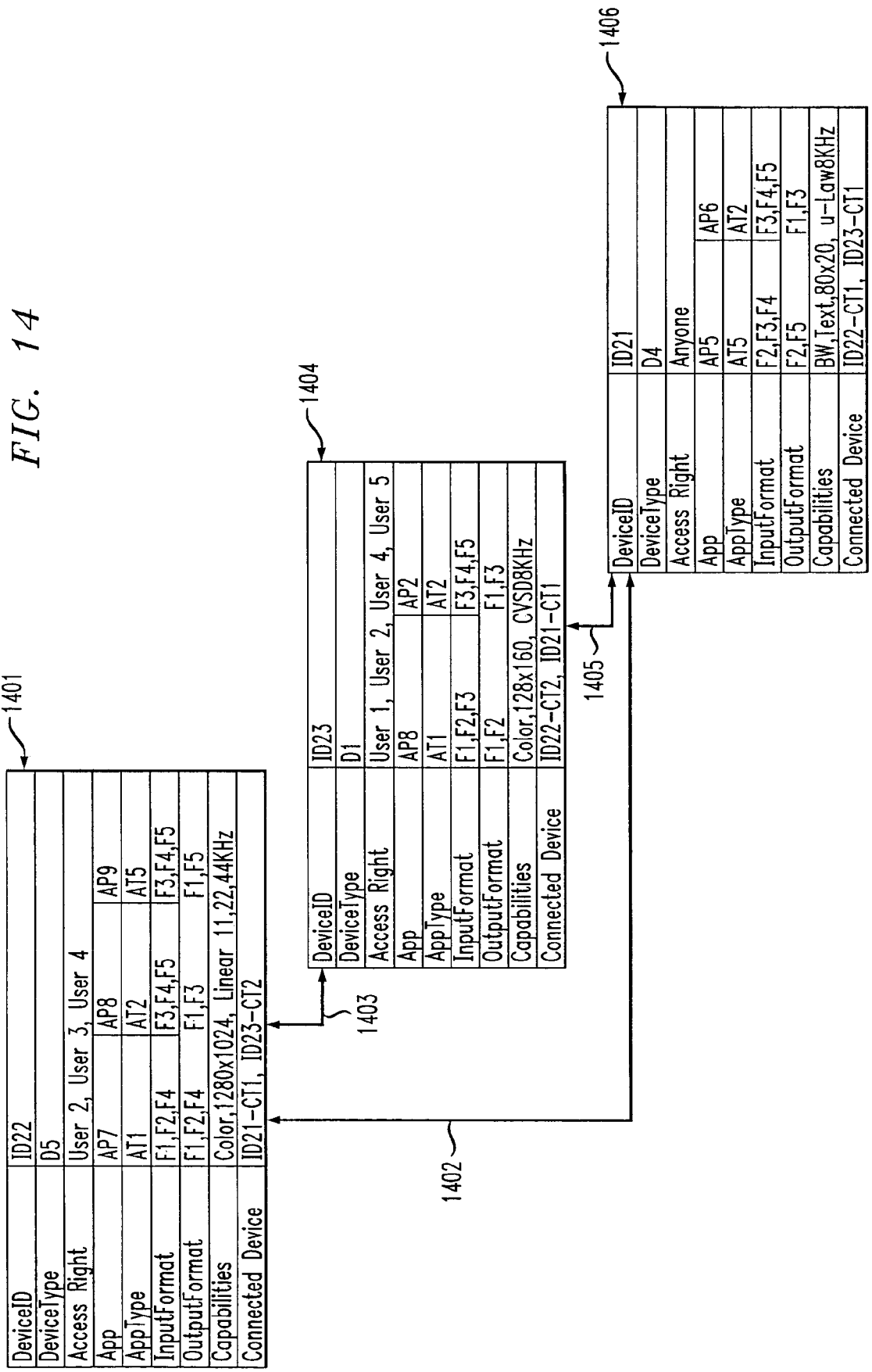
Figure 15:
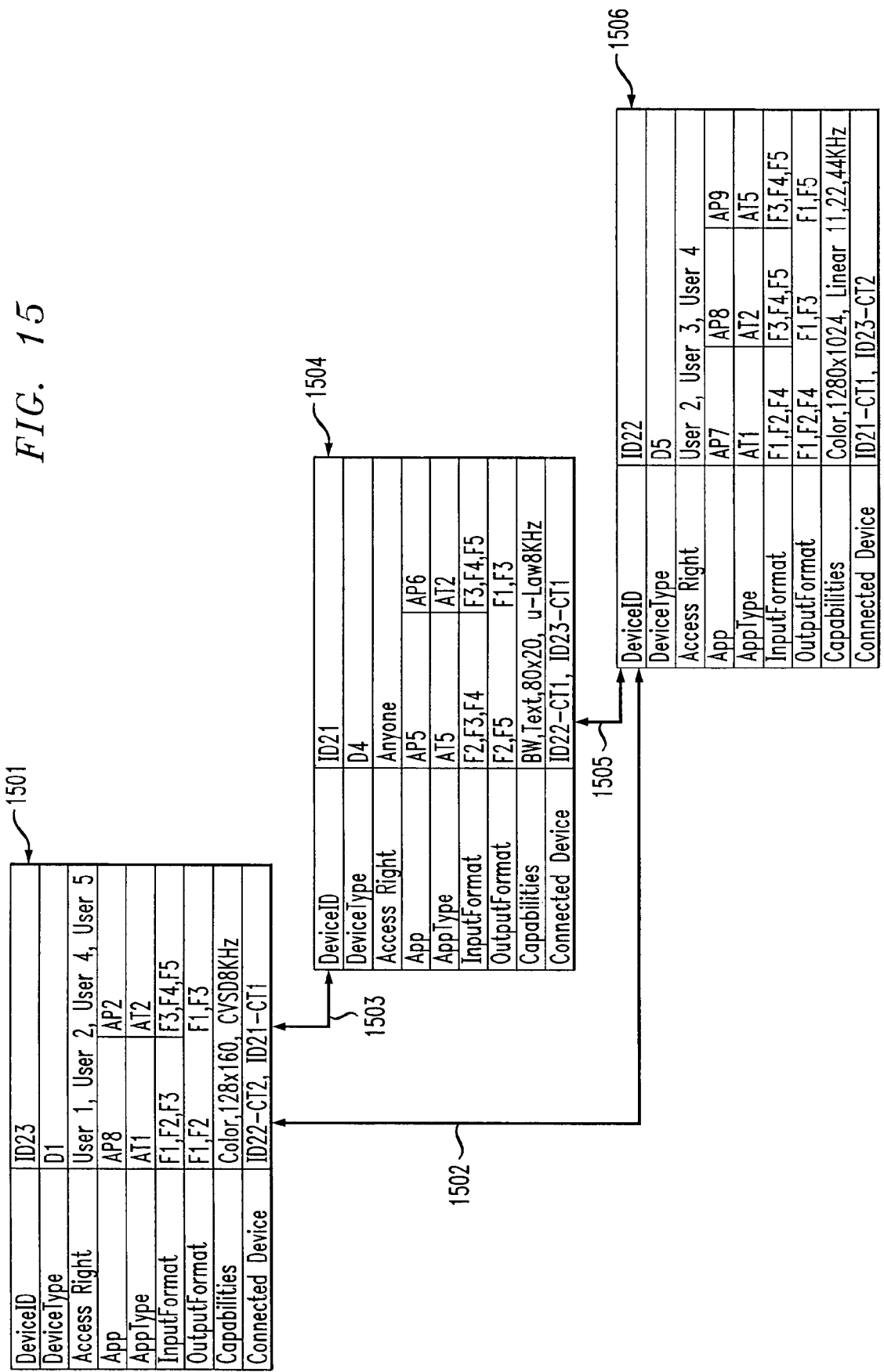

Turning to FIGS. 13 through 15, these figures illustrate the service directories created in the electronic devices 206 (device ID 21), 211 (device ID 22), and 209 (device ID 23), respectively, as shown in FIGS. 2 through 4. Block nodes for the services for the individual electronic devices are shown as block nodes 1301, 1401, and 1501, and services that are available through directed connected electronic devices are shown as block nodes 1304, 1306, 1404, 1406, 1504, and 1506. The connection links between the block nodes are shown as link information 1302, 1303, 1402, 1403, 1502, and 1503. It is important to note that instead of having the end of tree markers at the end of secondary block nodes 1304, 1306, 1404, 1406, 1504, and 1506, the block nodes are linked, via link information 1305, 1405, 1505, between each other.

Each block node that contains the service attributes should have information about the capability of the electronic devices, application types, data and their supported data formats. The supported data formats will be used to determine whether the electronic device is a candidate for performing the transformation of the data format. The physical connections and their types are also crucial information to determine the best route. Examples of this include electronic device type information, electronic device ID, application names and connected electronic devices as well as the physical link used for the connection.

Figure 16:
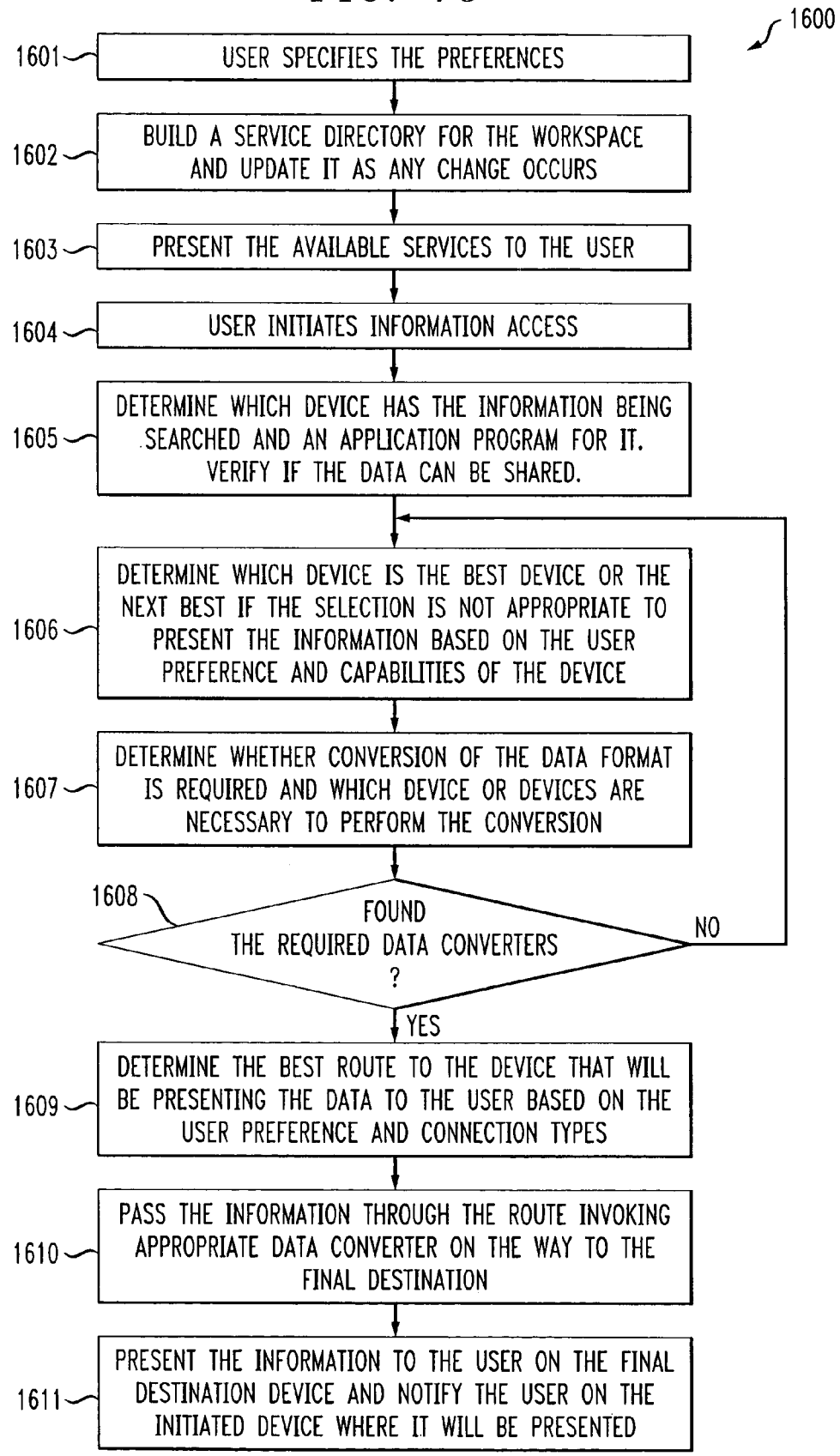
FIG. 16 illustrates an overview method for selecting an electronic device and dynamic routing of data to the selected electronic device, in accordance with a preferred embodiment of the invention.

Turning now to FIG. 16, an overview method 1600 is shown for selecting an electronic device and dynamic routing of data to the selected electronic device. In method 1600, a personal preference profile is beneficially created on each electronic device with user input so that the personal profile can be used as a policy to determine the best electronic device and the best route to the best electronic device. This occurs in step 1601. As the personal workspace is formed, service discovery is performed to create the service directory as discussed earlier. This occurs in step 1602. Once each electronic device is aware of all the available services and how to reach them, it is now ready to join a collaboration session. All available services will be presented to the user from any electronic device in the same workspace, as shown in step 1603.

As a user requests to access particular data from one of the electronic devices in his personal workspace, which occurs in step 1604, the electronic devices of the personal workspace should find where the source of the information and application that uses the information are stored (step 1605). The electronic devices of the personal workspace also need to verify that the data can be shared with the requester. This also occurs in step 1605.

In step 1606, the "best" electronic device to present the data based on the user preference and capability of electronic devices is determined. There could be many different criteria for user preferences, such as whether data should be displayed only on the electronic device that runs an identical application program, or on any electronic device that supports the similar application type and can present the information correctly. Furthermore, a user preference can be a criterion such as a display preference, such as whether the information should be displayed on the electronic device with the largest screen or on the electronic device that has a color screen. Other user preferences include whether the information should be split based on the media types or markup language tag types so that a partial information can be displayed on one electronic device while other parts are displayed on other electronic devices.

Suppose the "best" electronic device was determined through a multidimensional score. A polynomial could be used to determine the multidimensional score. For example, variables of f, where f=fidelity of reproduction, and p, where p=proximity to user attention, could be used. The variables correspond to the quantifiable information about the device, such as display capabilities. The variables may also correspond to application capabilities. For example, if two applications can present one data type, but one application is preferred over another, then one can have a higher user preference associated with it. Then a polynomial of $a_0 f + a_1 p + \ldots = S$, where S is the multidimensional score, could be used to compute the multidimensional score. The weights, $a_0$, $a_1, \ldots$, represent user preferences. Any technique may be used that can determine which user preferences apply to a data format and to determine a best electronic device from a group of electronic devices based on user preferences.

Once the best electronic device is selected, it is determined whether conversion of the data format should be performed in order to present the data (step 1607) to the electronic device that was selected as the "best" electronic device. There could be more than one electronic device that can perform the data conversion. Data conversion, as described above, includes transcoding, transformation, or both. If data conversion is needed, in step 1607, an attempt is made to find a data converter to use to convert the data. One or more data converters are determined using, for instance, user specified data converters for particular types of data and data conversion capabilities of electronic devices, including data conversion capabilities of the "best" electronic device. It is also possible that multiple data converters may be required to convert the data into the final format required by the best electronic device. If the required data converter or converters are not available (step 1608=No), the next best electronic device is selected in step 1606. If no electronic device can be found that can convert the data, the user can be notified that the information cannot be accessed (see, for example, step 755 of method 700 of FIG. 7B), or a portion of the data can be displayed in whichever format available on any electronic device based on, for example, user preference.

On the other hand, if the required electronic device that performs the data conversion is found (step 1608=Yes), the "best" route to the best electronic device is found. This occurs in step 1609. This best route passes through the electronic device having the data converter and can be selected based on, for example, user specified criteria such as bandwidth requirement and availability, power dissipation, the shortest route, and latency and connection types. Data is routed to the data converter in step 1609. If the data converter was not necessary, step 1609 determines the best route to the best electronic device without passing it through a data converter. Once the route has been determined, the data should be sent through the route, invoking one or more appropriate data converters on the way to the final destination, if necessary. This occurs in step 1610. Any available remote procedure call such as a simple object access protocol (SOAP) request can be used to remotely invoke a data conversion service. As another example, a proprietary message packet can be sent, prior to sending the data, to set up the data converter. Although an electronic device may appear to be capable of performing the data conversion from a viewpoint of another electronic device, it is the electronic device selected to perform the decoding that will actually determine that the requested data conversion can or cannot be performed on that electronic device.

As described above in reference to FIGS. 7A and 7B, it is also possible that the selected electronic device can only perform a partial data conversion. If the electronic device cannot perform any data conversion, it may suggest a delegate that can do the data conversion and inform the sender. If the electronic device is capable of performing the requested data conversion, or is capable of completing a partial data conversion, it will perform the data conversion as requested and pass the result to the best electronic device. The best electronic device also can reject the data, and pass the data onto the other electronic device, and inform that to the sender.

Finally, the received data is presented to the user when the data arrives on the best electronic device. This occurs in step 1611. An appropriate application that can present the data should be invoked unless the application is already executing and is ready to received the data. It is also desirable to notify the user on the initiating electronic device where the data is being presented.

The optimal route that was chosen by following the aforementioned steps determines which electronic devices will be participating in a collaboration session. The particular data stream passed through the optimal route forms a collaboration stream. It is also possible to have multiple collaboration streams within a collaboration session since each data stream may need to go through different data converter and the different data streams can find their final destination in different electronic devices. For examples, one data stream may be an MPEG video stream while another data stream may be chat message that was sent along the video stream. An audio stream can also sent through a different route from the above and may be played on an electronic device that has the best speaker while the video stream may be viewed on an electronic device that has the best display unit.

The electronic devices participating in a collaboration session forms, in one embodiment, a one large virtual computer that provides a personal workspace. When two personal workspaces are connected, the two personal workspaces again provide a bigger virtual computer. However, the amount of services available to the other user may be restricted by the access rights that are set by the user preferences.

It is to be understood that the embodiments and variations shown and described herein are merely illustrative of the principles of this invention and that various modifications may be implemented by those skilled in the art without departing from the scope and spirit of the invention. For example, the user preferences and the service directory may be placed on a single device in a workspace.

What is claimed is:

1. A method for providing a virtual workspace comprising a plurality of electronic devices, wherein information can be exchanged among the plurality of electronic devices through a plurality of connections between the electronic devices, the method performed by one or more of the electronic devices in the virtual workspace and comprising the steps of:

determining services available within the virtual workspace;

selecting one or more of said plurality of electronic device in the virtual workspace able to provide data of interest;

determining one or more data formats associated with the data, wherein a portion of the data has a given one of one or more data formats;

selecting, based at least in part on a plurality of predetermined criteria and the given data format, an electronic device of the plurality of electronic devices suitable for presenting at least the portion of the data by using one of the services, wherein the predetermined criteria comprise user preferences, and wherein the step of selecting an electronic device suitable for presenting further comprises the step of selecting, based on a multidimensional score determined using at least the user preferences;

determining a route through the plurality of connections to the selected electronic device suitable for presenting;

routing at least the portion of the data associated with the given data format through at least a portion of the route; and determining the multidimensional score by adding two or more terms, each term having a value determined by multiplying a variable by a weight, wherein each weight corresponds to a user preference.

2. The method of claim 1, wherein the data resides on a remote electronic device that is not one of the plurality of electronic devices or on one of the plurality of electronic devices.

3. The method of claim 1, wherein the virtual workspace is a first virtual workspace and wherein the selected electronic device suitable for presenting is one of a plurality of second electronic devices from a second virtual workspace, the first and second virtual workspaces connected through at least one additional connection.

4. The method of claim 1, wherein the portion of the data is one of the following: all of the data or less than all of the data.

5. The method of claim 1, wherein the selected electronic device suitable for presenting changes from a first selected electronic device to a second electronic device when an electronic device is added to or removed from the virtual workspace.

6. The method of claim 1, wherein the steps of selecting are performed by a user.

7. The method of claim 1, wherein the steps of selecting are performed again based on user request.

8. The method of claim 1, further comprising the step of presenting, by the selected electronic device suitable for presenting, at least the portion of the data.

9. The method of claim 8, further comprising the step of invoking an application used to present at least the portion of the data.

10. The method of claim 1, wherein the step of determining one or more data formats further comprises the step of determining the one or more data formats associated with the data by determining a file extension associated with the data.

11. The method of claim 1, wherein the step of determining one or more data formats further comprises the step of determining the one or more data formats associated with the data by determining a marker associated with the data.

12. The method of claim 11, wherein the marker is a markup language tag.

13. The method of claim 1, wherein the user preferences comprise one or more of fidelity of reproduction and proximity to user attention.

14. The method of claim 1, wherein the step of determining a route further comprises the step of determining, based on routing criteria, the given one or more connections in order to route the at least the portion of data associated with the given data format, wherein the routing criteria comprise one or more of performance criteria, power dissipation criteria, and connection type.

15. The method of claim 1, wherein the predetermined criteria further comprise device criteria.

16. The method of claim 15, further comprising the step of determining the device criteria through service discovery.

17. The method of claim 16, wherein the step of determining the device criteria through service discovery further comprises the step of accessing a service directory comprising one or more attributes corresponding to at least one of the electronic devices.

18. The method of claim 17, further comprising the step of creating the service directory by accessing each of the plurality of electronic devices in order to determine the one or more attributes.

19. The method of claim 17, wherein the service directory is stored on one or more of the electronic devices.

20. The method of claim 17, wherein the service directory is stored on a remote electronic device that is not one of the plurality of electronic devices.

21. The method of claim 1, wherein the step of routing further comprises the step of preventing access to the at least the portion of the data based on permission of the user to access the data or authentication of a user trying to access the data.

22. The method of claim 1, further comprising the step of converting the portion of data.

23. The method of claim 22, wherein the step of converting performs one or more transforming the portion of the data from the given data format to another data format and transcoding the portion of the data.

24. The method of claim 22, wherein the step of converting is performed by one or more of the plurality of electronic devices.

25. The method of claim 22, wherein the step of converting is performed by a particular electronic device that is not the selected electronic device suitable for presenting, and wherein the step of determining a route further comprises the step of determining a route through the plurality of connections and through the particular electronic device to the selected electronic device suitable for presenting, the route comprising the given one or more of the plurality of connections.

* * * * *